United States Patent
Hiramatsu et al.

(10) Patent No.: US 10,198,010 B2
(45) Date of Patent: Feb. 5, 2019

(54) CONTROL DEVICE FOR WORK VEHICLE

(71) Applicant: YANMAR CO., LTD., Osaka-Shi, Osaka (JP)

(72) Inventors: Toshifumi Hiramatsu, Osaka (JP); Wataru Nakagawa, Osaka (JP); Hideaki Aoki, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 63 days.

(21) Appl. No.: 15/128,837

(22) PCT Filed: Mar. 25, 2015

(86) PCT No.: PCT/JP2015/059258
§ 371 (c)(1),
(2) Date: Sep. 23, 2016

(87) PCT Pub. No.: WO2015/147108
PCT Pub. Date: Oct. 1, 2015

(65) Prior Publication Data
US 2018/0181143 A1 Jun. 28, 2018

(30) Foreign Application Priority Data

Mar. 26, 2014 (JP) .................................. 2014-063717
Jun. 30, 2014 (JP) .................................. 2014-135415

(51) Int. Cl.
G05D 1/02 (2006.01)
G05D 1/00 (2006.01)
A01B 69/04 (2006.01)

(52) U.S. Cl.
CPC ......... G05D 1/0295 (2013.01); A01B 69/008 (2013.01); G05D 1/0027 (2013.01);
(Continued)

(58) Field of Classification Search
CPC .. G05D 1/0295; G05D 1/0291; G05D 1/0287; G05D 1/0293; G05D 1/0278;
(Continued)

(56) References Cited

U.S. PATENT DOCUMENTS 6,148,255 A 11/2000 van der Lely
8,046,139 B2 10/2011 Diekhans et al.
(Continued)

FOREIGN PATENT DOCUMENTS

JP 4-101206 4/1992
JP 5-158537 6/1993
(Continued)

OTHER PUBLICATIONS

EP769551.1, International Search Report and Written Opinion dated Sep. 29, 2017, 8 pages—English.
(Continued)

*Primary Examiner* — Dale W Hilgendorf
(74) *Attorney, Agent, or Firm* — Norton Rose Fulbright US LLP

(57) ABSTRACT

If turning motion of an auxiliary moving work vehicle is complete, a control device (30) for an autonomous moving work vehicle (1) can communicate with a remote control device (112) provided in an auxiliary moving work vehicle (100) so that the autonomous moving work vehicle can restart work. Pivot turning, running for a set distance, and pausing are carried out. If a restart signal for a turning completion confirmation switch (114) provided in the auxiliary moving work vehicle (100) is received via the remote control device (112) or if a detected value for a steering sensor (120) provided in the auxiliary moving work vehicle (100) is sent to the control device (30) in the autonomous moving work vehicle (1) via the remote control device (112)

(Continued)

and the auxiliary moving work vehicle (100) turning and pivot turning is confirmed to be completed, work restarts.

11 Claims, 15 Drawing Sheets

(52) U.S. Cl.
CPC ......... *G05D 1/0246* (2013.01); *G05D 1/0278* (2013.01); *G05D 1/0287* (2013.01); *G05D 1/0291* (2013.01); *G05D 1/0293* (2013.01); *G05D 2201/0201* (2013.01)

(58) Field of Classification Search
CPC ............... G05D 1/0027; G05D 1/0246; G05D 2201/0201; A01B 9/008
See application file for complete search history.

(56) References Cited

U.S. PATENT DOCUMENTS

| | | | |
|---|---|---|---|
| 8,738,238 B2 * | 5/2014 | Rekow | G05D 1/0297 701/23 |
| 9,164,513 B2 | 10/2015 | Matsuzaki et al. | |
| 2007/0233348 A1 | 10/2007 | Diehans et al. | |
| 2011/0112730 A1 | 5/2011 | Rekow | |
| 2013/0211658 A1 * | 8/2013 | Bonefas | G05D 2201/020 701/28 |
| 2014/0257619 A1 | 9/2014 | Rekow | |
| 2014/0277899 A1 * | 9/2014 | Matsuzaki et al. | G05D 1/0287 701/25 |

FOREIGN PATENT DOCUMENTS

| | | |
|---|---|---|
| JP | 11-39036 | 2/1999 |
| JP | 2001-507843 | 6/2001 |
| JP | 2006-18675 | 1/2006 |
| JP | 2014-178759 | 9/2014 |
| WO | WO 99/18482 | 4/1999 |

OTHER PUBLICATIONS

PCT/JP2015/59258 International Search Report and Written Opinion dated Jun. 2, 2015, 11 pages—Japanese; 3 pages—English.
EP15769551.1 Extended European Search Report dated Oct. 9, 2017, 8 pages—English.

* cited by examiner

CONTROL DEVICE FOR WORK VEHICLE

CROSS REFERENCE TO RELATED APPLICATIONS

This application relates to and claims priority from PCT Ser. No.:PCT/JP2015/059258 filed Mar. 25, 2015, the entire contents of which are incorporated herein by reference, which in turn claims priority to JP Ser. No.:2014-063717 filed Mar. 26, 2014 and JP Ser. No.:2014-135415 filed Mar. 30, 2014.

FIGURE SELECTED FOR PUBLICATION

FIG. 4

BACKGROUND OF THE INVENTION

Field of the Invention

The present invention relates to a control device of a work vehicle, and relates to a control art that in the case of work with a unmanned autonomously moving work vehicle traveling autonomously and an manned auxiliary moving work vehicle accompanying to the autonomously moving work vehicle and traveling in parallel, parallel traveling of the autonomously moving work vehicle and the auxiliary moving work vehicle is maintained at the time of turning at a butt or the like.

Description of the Related Art

Conventionally, a master vehicle is operated by an operator, a slave vehicle is an unmanned vehicle, the master vehicle and the slave vehicle have respectively control devices, the vehicles can be communicated with each other by radio, and a program is provided which enables the slave vehicle to travel in parallel to the master vehicle. An art in which the master vehicle and the slave vehicle have distance measurement devices and a distance between the master vehicle and the slave vehicle is adjusted to a predetermined distance is known (for example, see the Patent Literature 1).

PRIOR ART REFERENCE

Patent Literature

Patent Literature 1: the Japanese Patent Laid Open Gazette 2001-507843

ASPECTS AND SUMMARY OF THE INVENTION

Problems to be Solved by the Invention

In the above art, when the master vehicle and the slave vehicle reach an edge of the field, the slave vehicle is shifted to manual operation and an operator operates the slave vehicle so as to move to a next work way. Accordingly, whenever the vehicles reach the edge of the field, it is necessary that the vehicles are stopped, and the operator changes the vehicles and makes the vehicles turn respectively. Therefore, work efficiency is worsened.

The present invention is provided in consideration of the conditions as mentioned above, and the purpose of the invention is to provide an art that an autonomously moving work vehicle traveling autonomously turns at a butt when reaching an edge of the field, stops once after finishing the turning, waits finish of butt turning of a manned auxiliary moving work vehicle, and resumes work when the turning of the manned auxiliary moving work vehicle is finished.

Means for Solving the Problems

The problems to be solved by the present invention have been described above, and subsequently, the means of solving the problems will be described below.

According to the present invention, in a control device of a work vehicle of a work system in which a manned or unmanned precedence work vehicle and a manned or unmanned following work vehicle travel in parallel reciprocally on a traveling route set in a field and work, each of the precedence work vehicle and the following work vehicle has the control device, a communication device which can be communicated with the other vehicle, a means for detecting butt turning, a means for stopping traveling and work, and a means for resuming the traveling and the work, and the traveling and the work of the following work vehicle is limited until the precedence work vehicle leaves a butt turning area.

According to the present invention, in a control device of a work vehicle of a work system in which a manned or unmanned precedence work vehicle and a manned or unmanned following work vehicle travel in parallel reciprocally on a traveling route set in a field and work, each of the precedence work vehicle and the following work vehicle has the control device, a communication device which can be communicated with the other vehicle, a butt turning start detection means, and a butt turning finish detection means, and when the control device of the precedence work vehicle detects start of butt turning, a butt turning start signal is transmitted to the following work vehicle, and the control device of the following work vehicle stops traveling and work.

According to the present invention, when the control device of the precedence work vehicle detects finish of the butt turning, the control device of the following work vehicle resumes the traveling and the work.

According to the present invention, when the control device of the following work vehicle detects the start of the butt turning, the control device of the precedence work vehicle stops the traveling and the work.

According to the present invention, when the control device of the following work vehicle detects the finish of the butt turning, the control device of the precedence work vehicle resumes the traveling and the work.

According to the present invention, in a control device of a work vehicle of a control system of parallel moving work vehicles in which an autonomously moving work vehicle having a position calculation means calculating a position of a vehicle body using a satellite positioning system, a steering actuator operating a steering device, an engine rotation control means, a speed change means, and the control device controlling them travels autonomously along a set traveling route stored in the control device, and the autonomously moving work vehicle can be operated by a remote control device mounted on an auxiliary moving work vehicle working while traveling auxiliary with the autonomously moving work vehicle, the control device of the autonomously moving work vehicle can be communicated with the remote control device provided in the auxiliary moving work vehicle, and the autonomously moving work vehicle is stopped once when traveling for a set distance after butt turning and resumes work when a resume signal is received from the remote control device of the auxiliary moving work vehicle.

According to the present invention, in a control device of a work vehicle of a work vehicle of a control system of parallel moving work vehicles in which an autonomously moving work vehicle having a position calculation means calculating a position of a vehicle body using a satellite positioning system, a steering actuator operating a steering device, an engine rotation control means, a speed change means, and the control device controlling them travels autonomously along a set traveling route stored in the control device, and the autonomously moving work vehicle can be operated by a remote control device mounted on an auxiliary moving work vehicle working while traveling auxiliary with the autonomously moving work vehicle, the control device of the autonomously moving work vehicle can be communicated with the remote control device provided in the auxiliary moving work vehicle, and when finish of butt turning of the auxiliary moving work vehicle is detected by the means for detecting the butt turning provided in the auxiliary moving work vehicle, a signal thereof is transmitted via the remote control device to the control device of the autonomously moving work vehicle so as to resume work.

According to the present invention, the means for detecting the butt turning or the butt turning start detection means and the butt turning finish detection means is a steering sensor and the control device judges as start of the butt turning when a detection value from the steering sensor is not less than a straight traveling angle for a set angle and judges as finish of the butt turning when the detection value is returned to the straight traveling angle and maintained for not less than set time.

According to the present invention, the means for detecting the butt turning or the butt turning start detection means and the butt turning finish detection means is an azimuth sensor, and the control device judges as start of the butt turning when an azimuth is changed for not less than a set value and judges as finish of the butt turning when the azimuth is reversed in the longitudinal direction from that before starting the butt turning.

According to the present invention, the means for detecting the butt turning or the butt turning start detection means and the butt turning finish detection means is a camera mounted on the autonomously moving work vehicle, the camera photos the following auxiliary moving work vehicle, and the control device processes an image of the camera and judges as start of the butt turning when the image of the auxiliary moving work vehicle is changed for not less than a set amount and judges as finish of the butt turning when the image of the auxiliary moving work vehicle is similar to the image before the turning.

According to the present invention, the means for detecting the butt turning or the butt turning start detection means and the butt turning finish detection means is a means for detecting a lifting height of a work machine, and the control device judges as start of the butt turning when the work machine is lifted to not less than a set height and judges as finish of the butt turning when the work machine is lowered to not more than the set height.

According to the present invention, the means for detecting the butt turning or the butt turning start detector and the but turning finish detector is a PTO (Power Take Off) detection means, and the control device judges as start of the butt turning when turning off of a PTO is detected and judges as finish of the butt turning when turning on of the PTO is detected.

According to the present invention, the means for detecting the butt turning or the butt turning start detection means and the butt turning finish detection means is a means for detecting a traveling speed, and the control device judges as start of the butt turning when the traveling speed is reduced to not more than a set speed and judges as finish of the butt turning when the traveling speed is increased to not less than the set speed after the reduction.

According to the present invention, the means for detecting the butt turning or the butt turning start detection means and the butt turning finish detection means is a speed change position detection means, and the control device judges as start of the butt turning when a speed change position is reduced to a turning speed and judges as finish of the butt turning when the speed change position is increased to a work speed.

According to the present invention, the means for detecting the butt turning or the butt turning start detection means and the butt turning finish detection means is an engine rotation speed detection means, and the control device judges as start of the butt turning when an engine rotation speed is reduced to not more than a set rotation speed and judges as finish of the butt turning when the engine rotation speed is increased to not less than the set rotation speed.

According to the present invention, the means for detecting the butt turning or the butt turning start detection means and the butt turning finish detection means is a position detection means using a satellite positioning system, and the control device judges as start of the butt turning when the vehicle enters a set butt turning area and judges as finish of the butt turning when the vehicle leaves the set butt turning area.

According to the present invention, in a control device of a work vehicle of a work vehicle of a control system of parallel moving work vehicles in which a precedence work vehicle having a position calculation means calculating a position of a vehicle body using a satellite positioning system, a steering actuator operating a steering device, an engine rotation control means, a speed change means, and the control device controlling them travels autonomously along a set traveling route stored in the control device, and a following work vehicle having a position calculation means calculating a position of a vehicle body using the satellite positioning system works while traveling auxiliary with the precedence work vehicle, the control device of the precedence work vehicle can be communicated with the remote control device provided in the following work vehicle, and the precedence work vehicle turns at a butt and travels while working, and stops the traveling and the work once when reaching a passing-by position with the following work vehicle.

According to the present invention, the control device of the precedence work vehicle resumes the traveling and the work when the following work vehicle turn to a direction perpendicular to a traveling direction of the precedence work vehicle at the butt turning.

In the control device of the work vehicle, a first satellite positioning system is mounted on the precedence work vehicle, a second satellite positioning system with lower accuracy than the first satellite positioning system is mounted on the remote control device carried into the following work vehicle, actual positions of the precedence work vehicle and the following work vehicle are positioned by the first satellite positioning system and the second satellite positioning system, and the positions of the precedence work vehicle and the following work vehicle are displayed by a display.

Effect of the Invention

According to the above means, the unmanned precedence work vehicle reaches the edge of the field, turns, waits automatically the following work vehicle, confirms the turning of the following work vehicle and then resumes the work. Accordingly, it is not necessary that an operator changes the unmanned precedence work vehicle and make the precedence work vehicle turn manually, whereby the work can be performed efficiently and the two vehicles do not work scatteringly.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
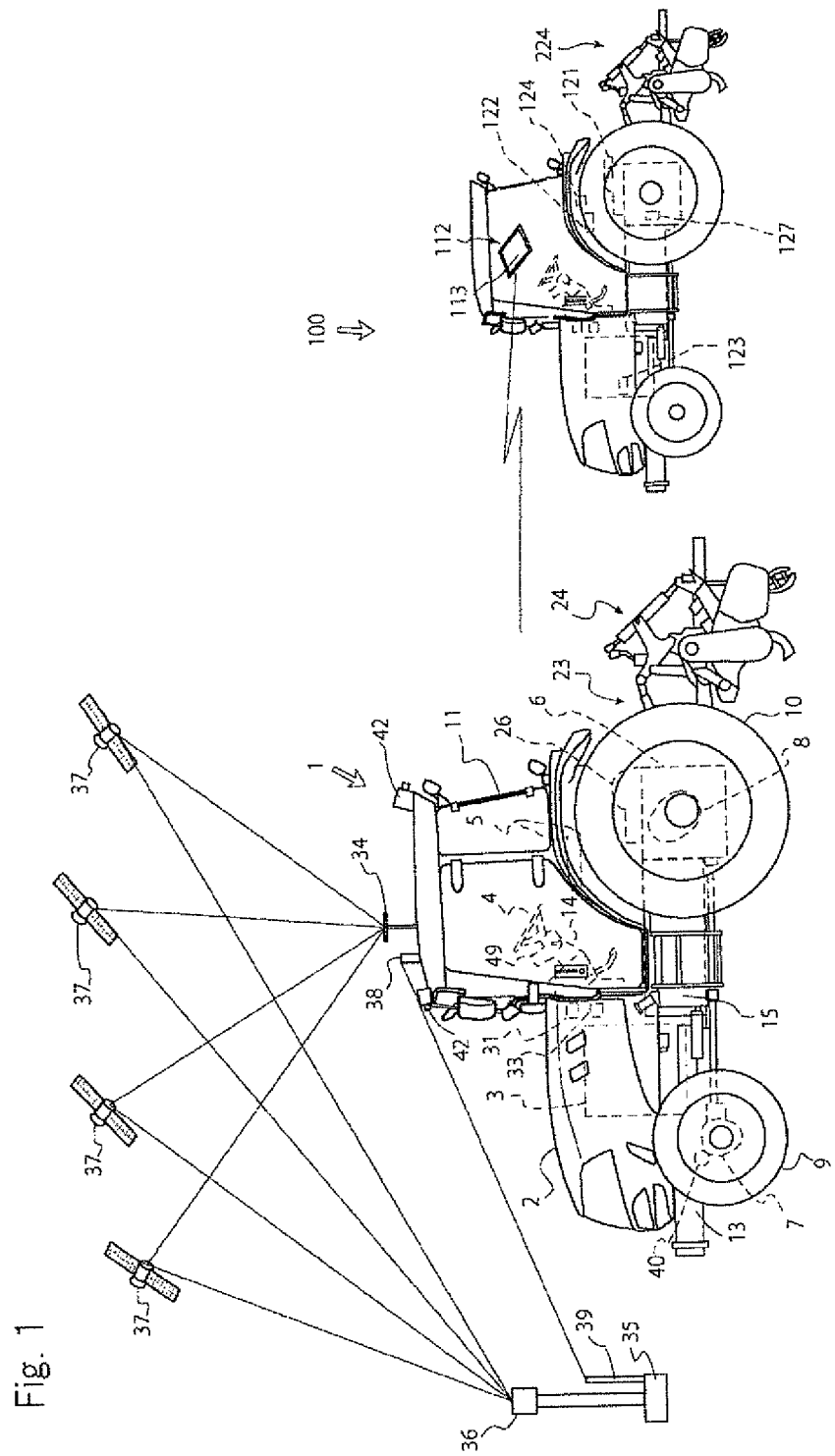
FIG. 1 is a schematic side view of an autonomous moving work vehicle, a GPS satellite and a reference station.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

A control device for a parallel moving work vehicle in which a manned or unmanned precedence work vehicle and a manned or unmanned following work vehicle travel in parallel and reciprocally along a set traveling route R in a field is explained.

Firstly, an embodiment in which the precedence work vehicle is an autonomous moving work vehicle 1 which can travel automatically unmannedly, the following work vehicle is a manned auxiliary moving work vehicle 100 operated and steered by an operator so as to travel following the autonomous moving work vehicle 1, the autonomous moving work vehicle 1 and the auxiliary moving work vehicle 100 are tractors, and rotary tilling devices 24 and 224 are attached as work machines respectively to the autonomous moving work vehicle 1 and the auxiliary moving work vehicle 100 is explained. The work vehicles are not limited to the tractors and may alternatively be combines or the like. The work machines are not limited to the rotary tilling devices and may alternatively be furrowers, mowers, rakes, seeding machines, fertilizing machines, wagons or the like.

Figure 2:
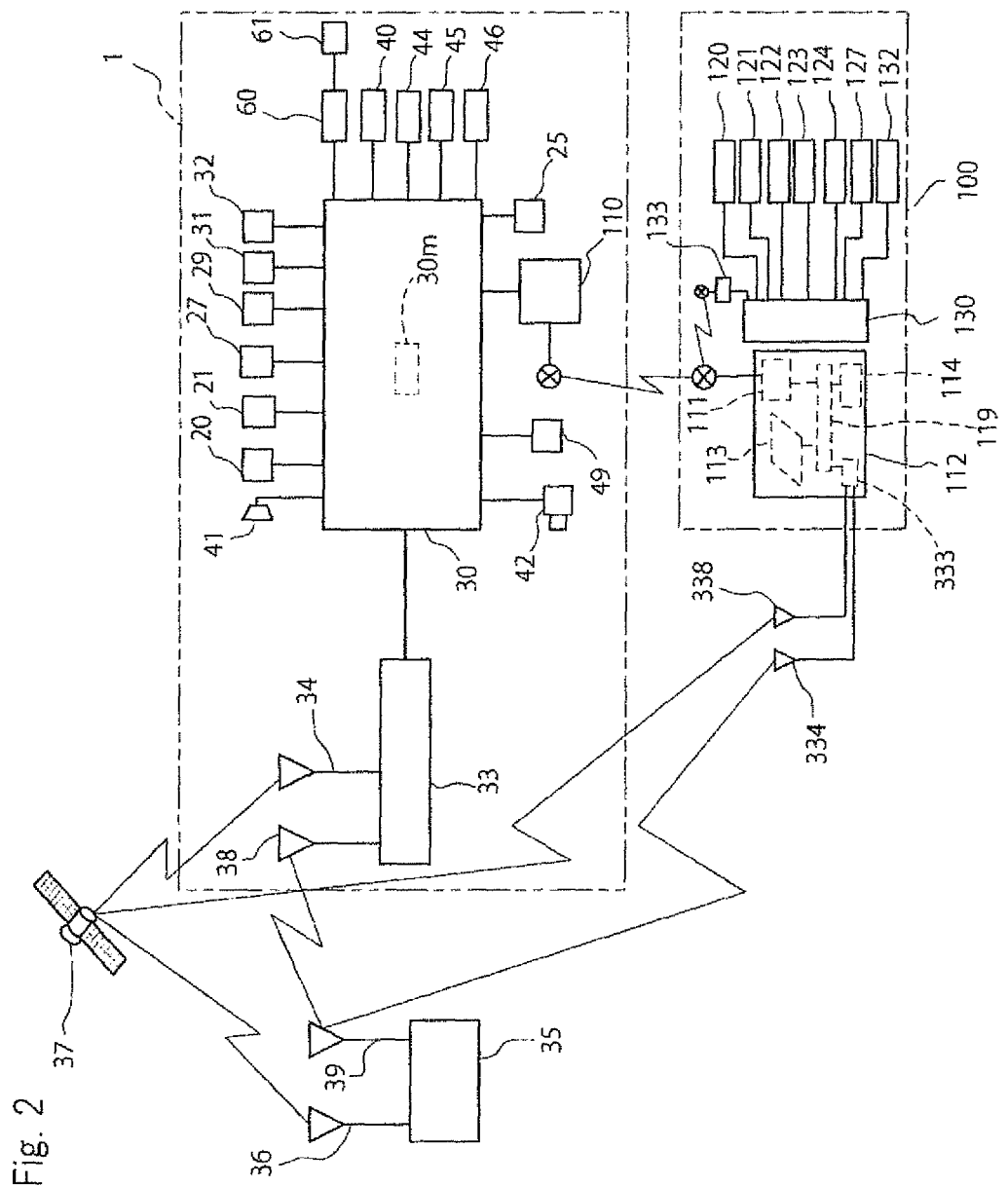
FIG. 2 is a control block diagram.

An entire configuration of the tractor which is the autonomous moving work vehicle 1 is explained referring to FIGS. 1 and 2. An engine 3 is provided in a bonnet 2, a dashboard 14 is provided in a cabin 11 behind the bonnet 2, and a steering wheel 4 which is a steering operation means is provided on the dashboard 14. By rotating the steering wheel 4, a direction of front wheels 9 is rotated via a steering device. A steering direction of the autonomous moving work vehicle 1 is detected by a steering sensor 20. The steering sensor 20 includes an angle sensor such as a rotary encoder and arranged at a rotation base of the front wheels 9. A detection configuration of the steering sensor 20 is not limited and any configuration which recognizes the steering direction may be used. Rotation of the steering wheel 4 may be recognized, or an operation amount of power steering may be recognized. A detection value obtained by the steering sensor 20 is inputted into a control device 30. The control device 30 has a CPU (central processing unit), a storage device 30*m* such as a RAM or a ROM, an interface and the like, and programs, data and the like for operating the autonomous moving work vehicle 1 are stored in the storage device 30*m*.

A seat 5 is disposed behind the steering wheel 4, and a transmission casing 6 is arranged below the seat 5. At left aid right sides of the transmission casing 6, rear axle casings 8 are provided continuously, and rear wheels 10 are supported via axles by the rear axle casings 8. Power from the engine 3 is changed in speed by a transmission (a main transmission and a sub transmission) in the transmission casing 6 and can drive the rear wheels 10. For example, the transmission includes a hydraulic stepless transmission, and a movable swash plate of a variable capacity hydraulic pump is operated by a speed change means 44 such as a motor so as to perform the speed change. The speed change means 44 is connected to the control device 30. A rotation speed of the rear wheels 10 is detected by a vehicle speed sensor 27 as a traveling speed detection means, and inputted into the control device 30 as a traveling speed. A detection method of the traveling speed and an arrangement position of the vehicle speed sensor 27 are not limited.

A brake device 46 is provided in the rear axle casings 8 and connected to the control device 30 so as to perform brake control.

A PTO clutch and a PTO transmission are housed in the transmission casing 6. The PTO clutch is engaged and disengaged by a PTO switching means 45. The PTO switching means 45 is connected to the control device 30 so as to control connection and disconnection of power transmission to a PTO shaft.

A front axle casing 7 is supported by a front frame 13 supporting the engine 3 and the front wheels 9 are supported at both sides of the front axle casing 7 so that power from the transmission casing 6 can be transmitted to the front wheels 9. The front wheels 9 are steering wheels and turned by rotation operation of the steering wheel 4, and the front wheels 9 can be steered laterally by a steering actuator 40 including a power steering cylinder which is a driving means of a steering device. The steering actuator 40 is connected to the control device 30 and controlled and driven by an automatic traveling means.

An engine controller 60 which is an engine rotation control means is connected to the control device 30, and an engine rotation speed sensor 61, a water temperature sensor, a hydraulic pressure sensor and the like are connected to the engine controller 60 so as to detect a state of the engine. The engine controller 60 can detect a load from a set rotation speed and an actual rotation speed and perform control so as to prevent overload, and can transmit the state of the engine 3 to a remote control device 112 discussed later so as to display the state of the engine 3 on a display 113.

In a fuel tank 15 below a step, a level sensor 29 detecting a level of fuel is arranged and connected to the control device 30. In a display means 49 provided in the dashboard of the autonomous moving work vehicle 1, a fuel gauge displaying residual amount of fuel is provided and connected to the control device 30. Information about the fuel residual amount is transmitted from the control device 30 to the remote control device 112, and the fuel residual amount and workable time are displayed on the display 113 of the remote control device 112.

On the dashboard 14, the display means 49 displaying a rotation meter of the engine, the fuel gauge, a monitor displaying hydraulic pressure and abnormality, a set value and the like are arranged.

The rotary tilling device 24 is provided movably vertically as the work machine behind a vehicle body of the tractor via a work machine attachment device 23 so as to perform tilling work. A lifting cylinder 26 is provided on the transmission casing 6, and by extending and contracting the lifting cylinder 26, a lifting arm constituting the work machine attachment device 23 is rotated so as to move the rotary tilling device 24 vertically. The lifting cylinder 26 is extended and contracted by a lifting actuator 25, and the lifting actuator 25 is connected to the control device 30. In the lifting arm of the work machine attachment device 23, an angle sensor 21 is provided as a means for detecting a lifting position so as to detect a lifting height of the work machine, and the angle sensor 21 is connected to the control device 30.

A mobile communication device 33 constituting a satellite positioning system is connected to the control device 30. A mobile GPS antenna 34 and a data reception antenna 38 are connected to the mobile communication device 33, and the mobile GPS antenna 34 and the data reception antenna 38 are provided on the cabin 11. The mobile communication device 33 has a position calculation means and can transmit latitude and longitude to the control device 30 so as to grasp an actual position. In addition to a GPS satellite (America), by using a global navigation satellite system (GNSS) such as a quasi-zenith satellite (Japan) and a GLONASS satellite (Russia), more accurate positioning can be performed. However, this embodiment is explained with the GPS satellite.

A gyro sensor 31 for obtaining information about change of posture of the vehicle body and an azimuth sensor 32 for detecting a traveling direction are provided in the autonomous moving work vehicle 1 and connected to the control device 30. The azimuth sensor 32 can be omitted because the traveling direction can be calculated by position measurement of the GPS.

The gyro sensor 31 detects an angle speed of inclination in a longitudinal direction of the autonomous moving work vehicle 1 (pitch), an angle speed of inclination in a lateral direction thereof (roll) and an angle speed of turning thereof (yaw). By integrating the three angle speeds, the inclination angles in the longitudinal direction and the lateral direction and the turning angle of the autonomous moving work vehicle 1 can be found. As a concrete example of the gyro sensor 31, a mechanical gyro sensor, an optical gyro sensor, a fluid type gyro sensor, a vibration type gyro sensor and the like are mentioned. The gyro sensor 31 is connected to the control device 30 and inputs information about the three angle speeds to the control device 30.

The azimuth sensor 32 detects a direction of the autonomous moving work vehicle 1 (traveling direction). As a concrete example of the azimuth sensor 32, a magnetic azimuth sensor and the like are mentioned. The azimuth sensor 32 is connected to the control device 30 and inputs information about the direction of the vehicle body to the control device 30.

As the above, the control device 30 calculates signals obtained from the gyro sensor 31 and the azimuth sensor 32 by a posture-azimuth calculation means so as to find the posture of the autonomous moving work vehicle 1 (the direction of the vehicle body, the inclination in the longitudinal direction and the lateral direction, and the turning direction).

Next, a method obtaining position information of the autonomous moving work vehicle 1 by the GPS (global positioning system) is explained.

The GPS is a system developed originally for navigation support of an airplane, a ship and the like, and includes twenty four GPS satellites (four satellites in each of six raceway surfaces) going around at an altitude of about 20,000 km, a control station pursuing and controlling the GPS satellites, and a communication device of an user for positioning.

As a positioning method using the GPS, various methods such as independent positioning, relative positioning, DGPS (differential GPS) positioning and RTK-GPS (real time kinematic GPS) positioning are mentioned, and either of these methods can be used. In this embodiment, a RTK-GPS positioning method (first satellite positioning system) with high accuracy is adopted and the autonomous moving work vehicle 1 is positioned. An operator having the remote control device 112 rides on the auxiliary moving work vehicle 100. A mobile communication device 333, a mobile GPS antenna 334 and a data reception antenna 338 are provided in the remote control device 112 so as to enable the relative positioning (D-GPS positioning, second satellite positioning system), whereby a relative position between the autonomous moving work vehicle 1 and the remote control device 112 can be detected by a cheap D-GPS sensor with lower accuracy than the RTK-GPS positioning method. The relative position can be displayed on the display 113 of the remote control device 112. Accordingly, the relative position between the autonomous moving work vehicle 1 and the auxiliary moving work vehicle 100 can be grasped while operating the remote control device 112 so as to recognize easily excessive approach, excessive alienation and the like.

A method of the RTK-GPS positioning is explained referring to FIGS. 1 and 2.

The RTK-GPS (real time kinematic GPS) positioning is a method that GPS observation is performed simultaneously at a reference station whose position is known and a mobile station whose position is to be found, data observed at the reference station is transmitted to the mobile station on real time by a method such as wireless communication, and the position of the mobile station is found on real time based on positional results of the reference station.

In this embodiment, the mobile communication device 33, the mobile GPS antenna 34 and the data reception antenna 38 constituting the mobile station are arranged in the autonomously moving work vehicle 1, and a fixed communication device 35, a fixed GPS antenna 36 and a data transmission antenna 39 constituting the reference station are disposed at a predetermined position not being obstacle of work in the field. In the RTK-GPS (real time kinematic GPS) positioning of this embodiment, measurement of a phase (relative positioning) is performed at both the reference station and the mobile station, and data positioned by the fixed communication device 35 of the reference station is transmitted from the data transmission antenna 39 to the data reception antenna 38.

The mobile GPS antenna 34 arranged in the autonomously moving work vehicle 1 receives signals from GPS satellites 37. The signals are transmitted to the mobile communication device 33 and positioned. Simultaneously, the signals from GPS satellites 37 are received by the fixed GPS antenna 36 which is the reference station, positioned by the fixed communication device 35 and transmitted to the mobile communication device 33, and the measured data are analyzed so as to determine the position of the mobile station. The position information obtained as the above is transmitted to the control device 30.

Accordingly, the control device 30 of the autonomously moving work vehicle 1 has an automatic traveling means traveling automatically. The automatic traveling means receives electric waves transmitted from the GPS satellites 37, finds the position information of the vehicle body at set time intervals in the mobile communication device 33, and finds displacement information and azimuth information of the vehicle body from the gyro sensor 31 and the azimuth sensor 32, and controls the steering actuator 40, the speed change means 44, the lifting actuator 25, the PTO switching means 45, the engine controller 60 and the like so as to make the vehicle body travel along a set route R set previously based on the position information and the azimuth information, thereby working automatically. Position information of an outer perimeter of a field H which is a work range (map information) is set previously by a known method and stored in the storage device 30*m*.

In the D-GPS positioning between the remote control device 112 and the mobile station, independent positioning is performed at both points, positioning error is found by the mobile station, correction information thereof is transmitted to the remote control device 112 via the data reception antenna 38, and the correction is performed so as to find the position of the remote control device 112. The position of the remote control device 112 and the position of the autonomously moving work vehicle 1 can be displayed by the display 113 and the display means 49 and distance therebetween is calculated so as to recognize easily relative positions of the autonomously moving work vehicle 1 and the auxiliary moving work vehicle 100.

An obstacle sensor 41 is arranged in the autonomously moving work vehicle 1 and connected to the control device 30 so as to prevent contact with the obstacle. For example, the obstacle sensor 41 includes a laser sensor or an ultrasonic sensor, arranged at front, side or rear part of the vehicle body and connected to the control device 30, and detects whether an obstacle exists before, beside or behind the vehicle body and stops the traveling when the obstacle approaches within a set distance.

In the autonomously moving work vehicle 1, the camera 42 photographing a front side, a rear side and the work machine is mounted and connected to the control device 30. An image photographed by the camera 42 is displayed on the display 113 of the remote control device 112 provided in an auxiliary moving work vehicle 100. When a display screen of the display 113 is small, the image may be displayed by another large display, or the camera image may be displayed always or alternatively by another display of exclusive use or displayed by the display means 49 provided in the autonomously moving work vehicle 1. The camera 42 may be configured so that one camera 42 is arranged at a center of the vehicle body and turned around a vertical axis so as to photo the circumference or that a plurality of cameras 42 are arranged at front and rear sides or four corners of the vehicle body so as to photo the circumference, and the configuration is not limited.

The remote control device 112 sets the traveling route R of the autonomously moving work vehicle 1, controls the autonomously moving work vehicle 1 remotely, supervises traveling state of the autonomously moving work vehicle 1 and operation state of the work machine, and stores work data.

An operator rides on and operates the auxiliary moving work vehicle 100, and the remote control device 112 is mounted on the auxiliary moving work vehicle 100 so as to operate the autonomously moving work vehicle 1. An explanation of a basic configuration of the auxiliary moving work vehicle 100 is omitted because it is substantially the same as the autonomously moving work vehicle 1.

The remote control device 112 can be attached to and detached from an operation part such as a dashboard of the auxiliary moving work vehicle 100 and the autonomously moving work vehicle 1. The remote control device 112 can be operated while being attached to the dashboard of the auxiliary moving work vehicle 100, can be taken out from the auxiliary moving work vehicle 100 and operated while being carried, or can be operated while being attached to the dashboard of the autonomously moving work vehicle 1. For example, the remote control device 112 can be configured by a note-type or tablet-type personal computer. In this embodiment, a tablet-type personal computer is used.

Furthermore, the remote control device 112 and the autonomously moving work vehicle 1 can be communicated with each other on radio, and communication devices 110 and 111 for the communication are provided respectively in the autonomously moving work vehicle 1 and the remote control device 112. The communication device 111 is configured integrally with the remote control device 112. For example, the communication means can be communicated with each other by wireless LAN such as WiFi. In a surface of a casing of the remote control device 112, the display 113 which is a touch panel-type operation screen which can be operated by touching the screen is provided, and the communication device 111, a CPU and a storage device as a control device 119, a battery and the like are housed in the casing. An image of the surrounding photographed by the camera 42, state of the autonomously moving work vehicle 1, state of work, information about the GPS, the operation screen and the like can be displayed on the display 113 so as to be supervised by an operator.

Figure 4:
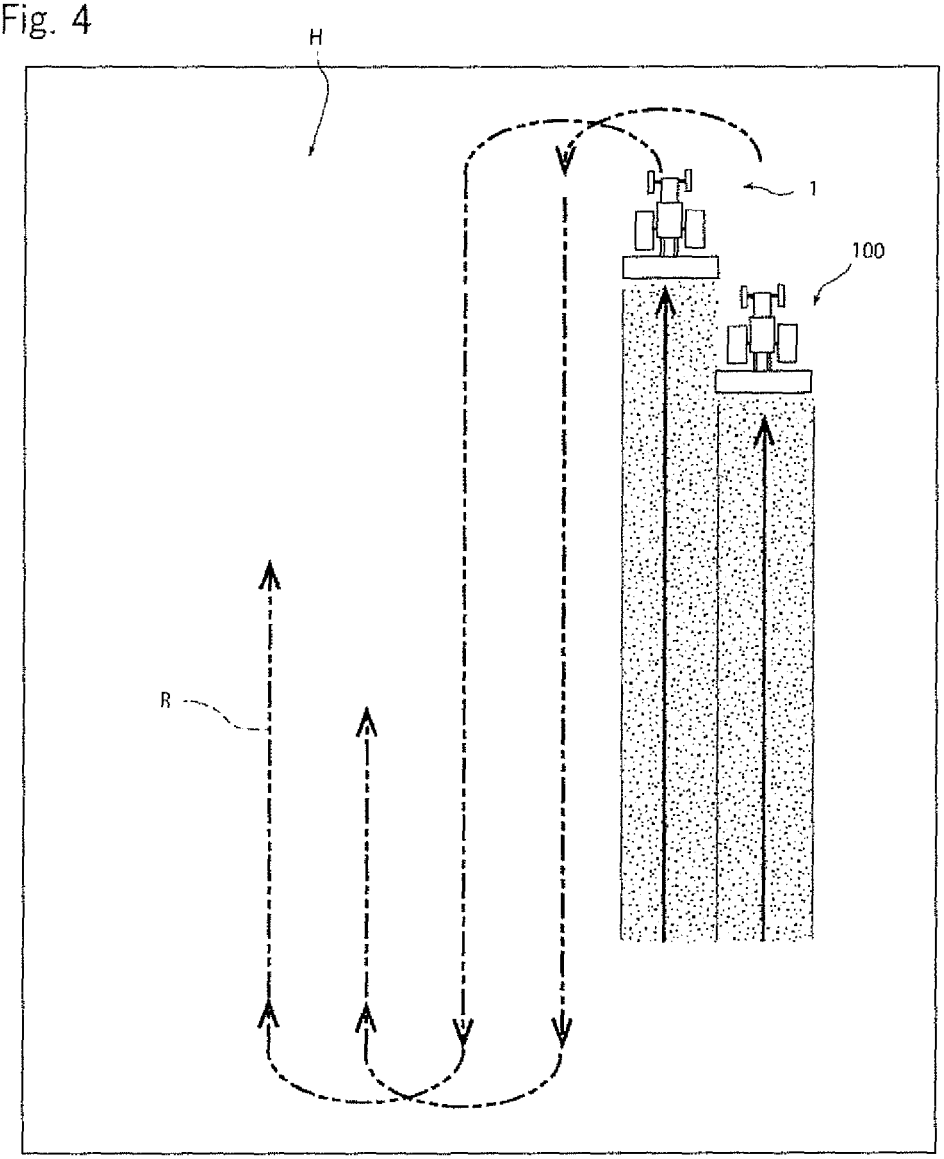
FIG. 4 is a drawing of a state before an edge of a field in parallel traveling work.

As shown in FIG. 4, the autonomously moving work vehicle 1 travels along the set traveling route R and the auxiliary moving work vehicle 100 travels behind aslant (or beside) it so that the work is performed while the auxiliary moving work vehicle 100 supervises the autonomously moving work vehicle 1.

The autonomously moving work vehicle I can be operated remotely by the remote control device 112. For example, by operating the remote control device 112, sudden stop, temporary stop, restart, speed change, change of engine rotation speed, vertical movement of the work machine, engagement and disengagement of the PTO clutch and the like of the autonomously moving work vehicle 1 can be operated. Namely, an accelerator actuator, the speed change means 44, the PTO switching means 45, the brake device 46 and the like are controlled by the remote control device 112 via the communication device 111, the communication device 110 and the control device 30 so that an operator can operate the autonomously moving work vehicle 1 remotely easily.

A control device 130 is provided in the auxiliary moving work vehicle 100 and the control device 130 can communicate with the remote control device 112 via a communication device 133. A steering sensor 120 configured similarly to the steering sensor 20 is provided in the auxiliary moving work vehicle 100 and connected to the control device 130. Accordingly, steering operation of a steering wheel of the auxiliary moving work vehicle 100 is detected by the steering sensor 120 and inputted into the control device 130. A steering operation signal from the steering sensor 120 is transmitted by the control device 130 via the communication device 133 to the remote control device 112, and the control device 119 of the remote control device 112 judges whether the vehicle body turns at a butt or not from the steering operation signal (a case in which turning at the butt is judged by the detection value of the steering sensor as a means for detecting the butt turning is referred to as a first embodiment). For example, in the butt turning, the steering wheel is turned to the maximum and the vehicle travels for a predetermined distance so as to change a direction of the vehicle body for 180° while returning the steering wheel, whereby the butt turning can be recognized easily. Similarly to the steering sensor 20 of the autonomously moving work vehicle, the steering sensor 120 includes an angle sensor such as a rotary encoder, and detects rotation of a steering device such as front wheels, a knuckle arm and the steering wheel and detects operation amount of power steering, and the configuration is not limited and any configuration which recognizes the steering direction may be used. Judgment of finish of the butt turning of the auxiliary moving work vehicle 100 may be performed by either the control device 30 or the control device 130.

For judging the butt turning, an azimuth sensor 132 may alternatively be provided in the auxiliary moving work vehicle 100 (the case in which the butt turning is judged by detection value of the azimuth sensor as a means for detecting the butt turning is referred to as a second embodiment). The azimuth sensor 132 is connected to the control device 130. Accordingly, when the auxiliary moving work vehicle 100 is turned and the traveling direction is changed, azimuth of the traveling direction is detected by the azimuth sensor 132 and inputted into the control device 130. An azimuth signal is transmitted from the control device 130 via the communication means to the remote control device 112, and the control device 119 of the remote control device 112 judges whether the vehicle body turns at the butt or not from the azimuth signal. For example, the case in which a direction of the vehicle body is changed gradually so as to change the direction for 180° can be recognized easily as the butt turning by the azimuth sensor 132.

For judging the butt turning, it may alternatively be configured that the auxiliary moving work vehicle 100 is photographed by the camera 42 provided in the autonomously moving work vehicle 1 and whether the butt turning is performed or not is judged from the image (the case in which the butt turning is judged by detection value of the camera as a means for detecting the butt turning is referred to as a third embodiment). The camera 42 may be provided on the cabin 11 of the autonomously moving work vehicle 1 so as to photo a slanting back side, or the camera 42 may be arranged at the center of the vehicle body and turned so as to photo the outer perimeter. Accordingly, after the butt turning of the autonomously moving work vehicle 1, the image photographed by the camera 42 is inputted into the control device 30, the control device 30 processes the image so as to judge whether the auxiliary moving work vehicle 100 exists behind aslant thereof or not, and when an image of the auxiliary moving work vehicle 100 after the autonomously moving work vehicle 1 finishes the butt turning resembles the image before the turning, the control device 30 of the autonomously moving work vehicle 1 judges that the butt turning of the auxiliary moving work vehicle 100 is finished.

For judging the butt turning, it may alternatively be configured that a work machine vertical movement detection means detecting vertical movement of the work machine (the rotary tilling device 224) of the auxiliary moving work vehicle 100 is provided and the case in which the work machine is lowered after the butt turning is judged as the finish of the butt turning (the case in which the butt turning is judged by detection value of the work machine vertical movement detection means as a means for detecting the butt turning is referred to as a fourth embodiment). Namely, the work machine vertical movement detection means of the auxiliary moving work vehicle 100 is a lifting switch, an angle sensor 121 detecting rotation of a work machine equipment device (a lift arm and a lower link) or the like, and the like, and the work machine is lifted when the auxiliary moving work vehicle 100 reaches an edge of the field and the work machine is lowered after finishing the butt turning. A lifting signal and a lowering signal of the work machine are transmitted to the control device 30 of the autonomously moving work vehicle 1, and the autonomously moving work vehicle 1 judges that the butt turning is finished by the lowering of the work machine of the auxiliary moving work vehicle 100.

For judging the butt turning, it may alternatively be configured that a PTO on/off detection means 124 detecting turning on and off of a PTO of the work machine instead of the vertical movement of the work machine is provided and the finish of the butt turning is judged by an on/off signal (the case in which the butt turning is judged by detection value of the PTO on/off detection means as a means for detecting the butt turning is referred to as a fifth embodiment).

For judging the butt turning, it may alternatively be configured that a vehicle speed sensor 127 as a traveling speed detection means detecting the traveling speed of the auxiliary moving work vehicle 100 is provided and the finish of the butt turning is judged by the traveling speed or variation of the traveling speed (the case in which the butt turning is judged by detection value of the traveling speed detection means as a means for detecting the butt turning is referred to as a sixth embodiment). Namely, when the auxiliary moving work vehicle 100 approaches the edge of the field, the traveling speed is reduced (or the traveling is stopped further) and the vehicle is turned at low speed (set butt turning speed) while the work machine is lifted, and after finishing the butt turning, the vehicle is stopped, the work machine is lowered, the traveling speed is accelerated to work speed and the work is resumed. Accordingly, the finish of the butt turning can be judged.

For judging the butt turning, it may alternatively be configured that a speed change position detection means 122 detecting a speed change position of the auxiliary moving work vehicle 100 is provided instead of the traveling speed detection means and the finish of the butt turning is judged by change of a speed change position signal (the case in which the butt turning is judged by detection value of the speed change position detection means as a means for detecting the butt turning is referred to as a seventh embodiment).

For judging the butt turning, it may alternatively be configured that an engine rotation speed detection means 123 detecting engine rotation speed of the auxiliary moving work vehicle 100 is provided instead of the traveling speed detection means and the finish of the butt turning is judged by the engine rotation speed or variation of the engine rotation speed (the case in which the butt turning is judged by detection value of the engine rotation speed detection means as a means for detecting the butt turning is referred to as an eighth embodiment).

Next, control of the butt turning at the time of parallel traveling work is explained referring to FIGS. 3 to 6.

Figure 3:
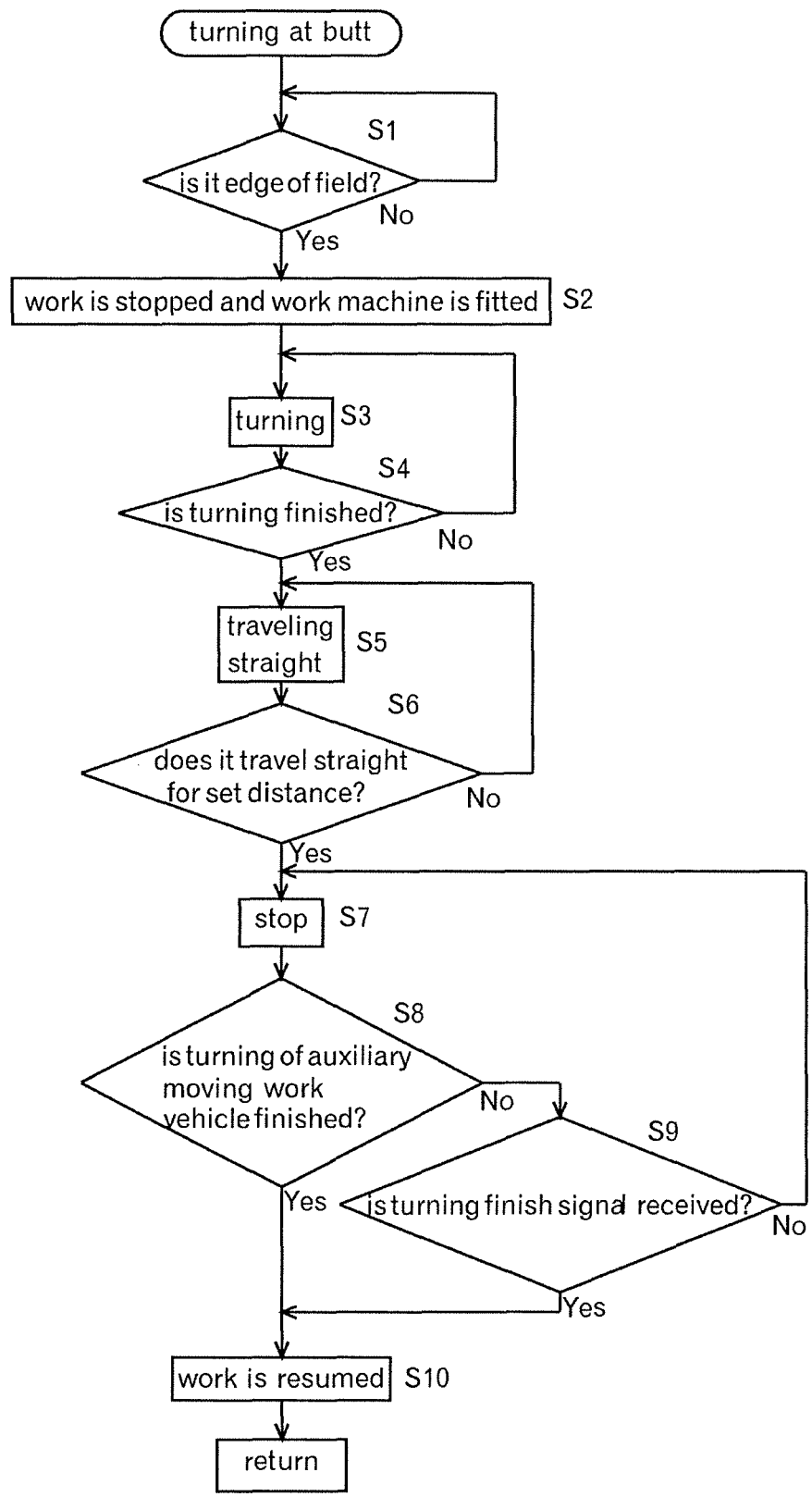
FIG. 3 is a flow chart of control of turning at a butt.

Firstly, as shown in FIGS. 3 and 4, when the autonomously moving work vehicle 1 reaches an edge of the field (enters a butt turning area U in FIG. 10) (S1), the work is stopped, the work machine is lifted (S2) and turning operation is started (S3). The stop of the work is control that the control device 30 operates the PTO switching means 45 so as to cut off power to a PTO shaft and the lifting of the work machine is control that the control device 30 operates the lifting actuator 25 so as to extend the lifting cylinder 26, and the similar control is performed in below stop of the work and below lifting of the work machine (in both the autonomously moving work vehicle 1 and the auxiliary moving work vehicle 100).

Figure 5:
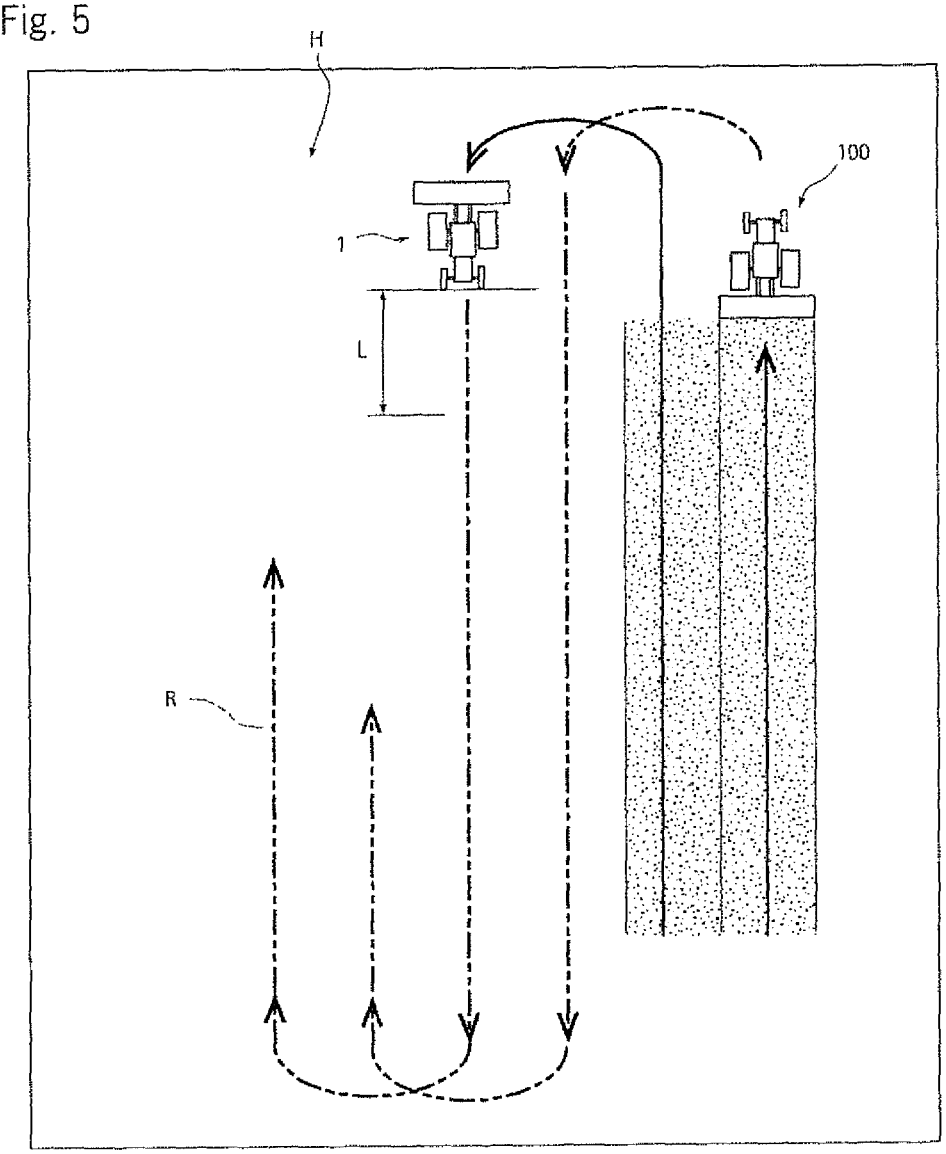
FIG. 5 is a drawing of a state of turning at the edge of the field in the parallel traveling work.
Figure 6:
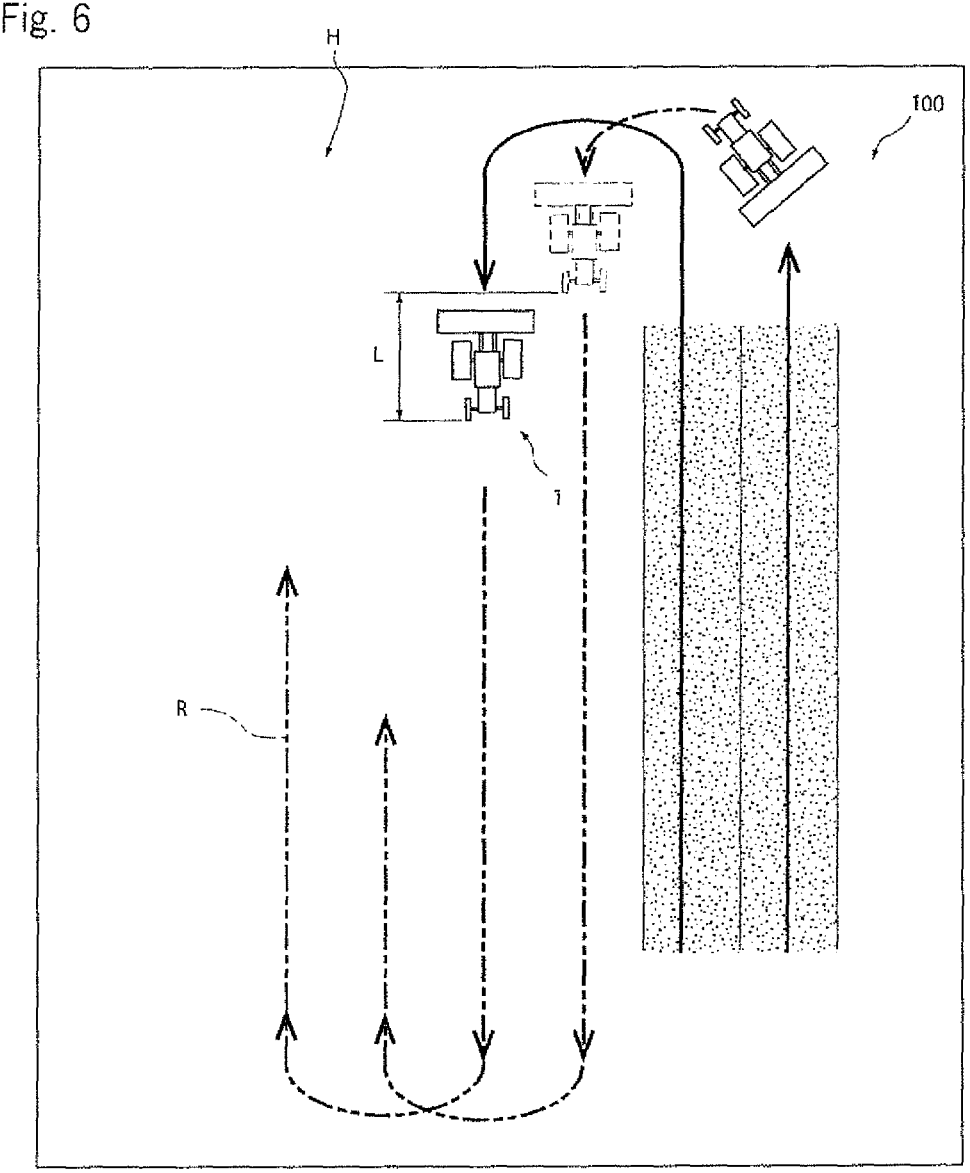
FIG. 6 is a drawing of a standby state at the edge of the field in the parallel traveling work.

As shown in FIG. 5, when the turning is finished (S4), the work machine is lowered and the vehicle travels straight while the work is performed (S5), and as shown in FIG. 6, whether the vehicle travels for a set distance L and reaches a waiting position or not is judged (S6). When the vehicle travels to the waiting position, the travel and the work are stopped (S7). The waiting position may be a work start position of an adjacent process, and in this case, after the turning is finished, the vehicle travels straight for the set distance L without working, and lowers the work machine and waits. The stop of the traveling is control that the control device 30 operates the speed change means 44 and the brake device 46 so as to make the traveling speed 0 and the lowering of the work machine is control that the control device 30 operates the lifting actuator 25 so as to contract the lifting cylinder 26, and the similar control is performed in below stop of the traveling and below lowering of the work machine (in both the autonomously moving work vehicle 1 and the auxiliary moving work vehicle 100).

The autonomously moving work vehicle 1 waits the finish of the turning of the auxiliary moving work vehicle 100 at the waiting position at which the traveling is stopped (S8). Namely, the finish of the turning of the auxiliary moving work vehicle 100 is judged by detecting the butt turning in the first embodiment by the steering sensor 120 provided in the auxiliary moving work vehicle 100. In this case, the signal of the steering sensor 120 is transmitted via the control device 130 and the communication means to the remote control device 112, and the control device 119 of the remote control device 112 judges whether the butt turning is performed or not. When the butt turning is finished, a work resume signal is transmitted and the work is resumed simultaneously to start of the traveling of the autonomously moving work vehicle 1 (S10). When the butt turning is not performed, an operator of the auxiliary moving work vehicle 100 judges whether a finish signal is transmitted or not (S9). Namely, a turning finish confirmation switch 114 is provided in a dashboard or the remote control device 112 of the auxiliary moving work vehicle 100, and when the operator turns on the turning finish confirmation switch 114, the resume signal is transmitted to the autonomously moving work vehicle 1 and the control device 30 of the autonomously moving work vehicle 1 judges that the butt turning is finished, whereby the work is resumed (S10). The turning finish confirmation switch 114 can be operated optionally by the operator so as to resume the work, and for example, even when the turning of the auxiliary moving work vehicle 100 is not finished yet, or the turning is at the middle, the finish of the turning is judged compulsorily by turning on the turning finish confirmation switch 114 so as to resume the work. Accordingly, waiting time of the autonomously moving work vehicle 1 can be omitted so as to shorten work time. The resume of the work includes resume of the traveling. The start of the traveling is control that the control device 30 cancels braking of the brake device 46 and operates the speed change means 44 so as to accelerate the traveling speed to set work speed and the start or resume of the work is control that the control device 30 operates the PTO switching means 45 so as to transmit power to the PTO shaft, and the similar control is performed in below start of the traveling and below start or resume of the work (in both the autonomously moving work vehicle 1 and the auxiliary moving work vehicle 100).

Figure 7:
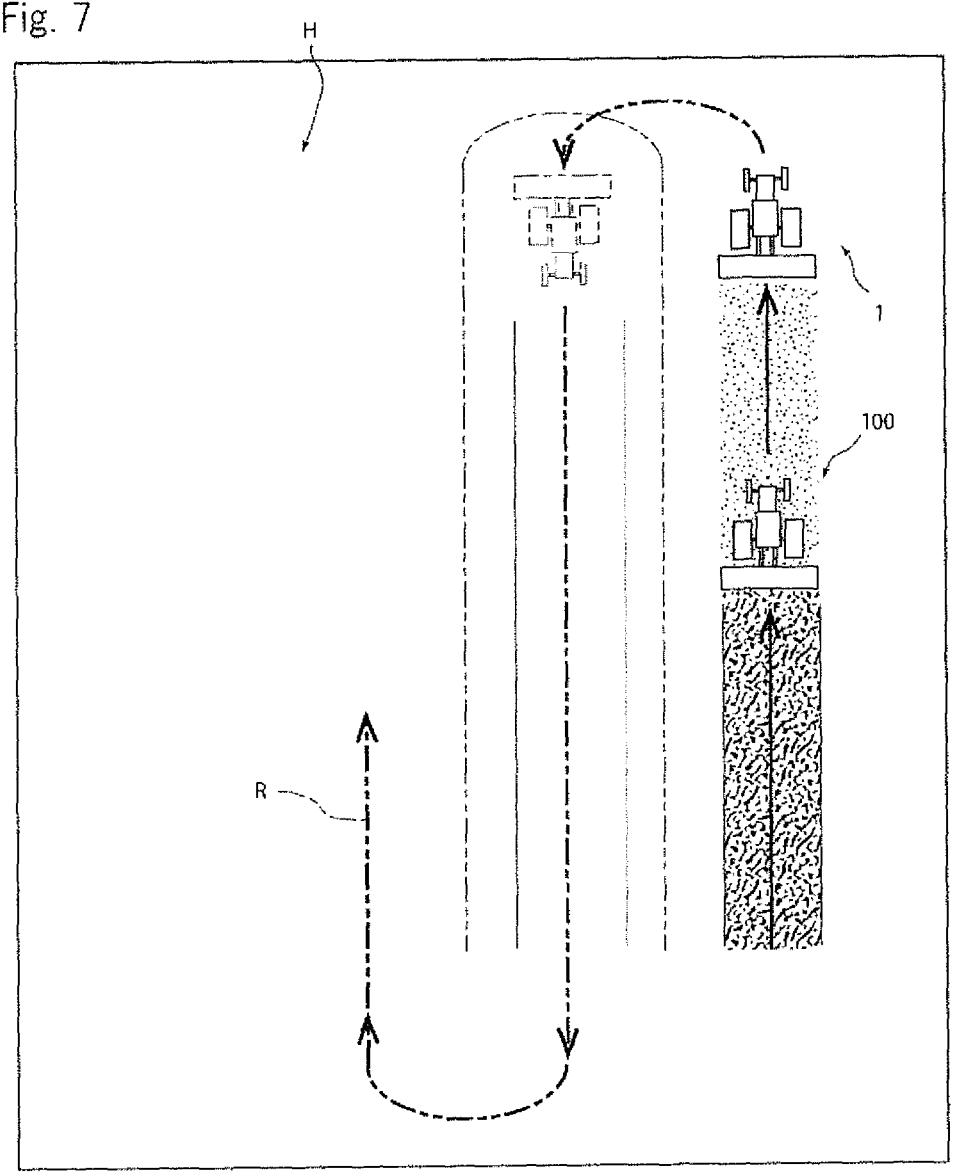
FIG. 7 is a drawing of a state of work in which a precedence work vehicle and a following work vehicle are in a longitudinal line.
Figure 8:
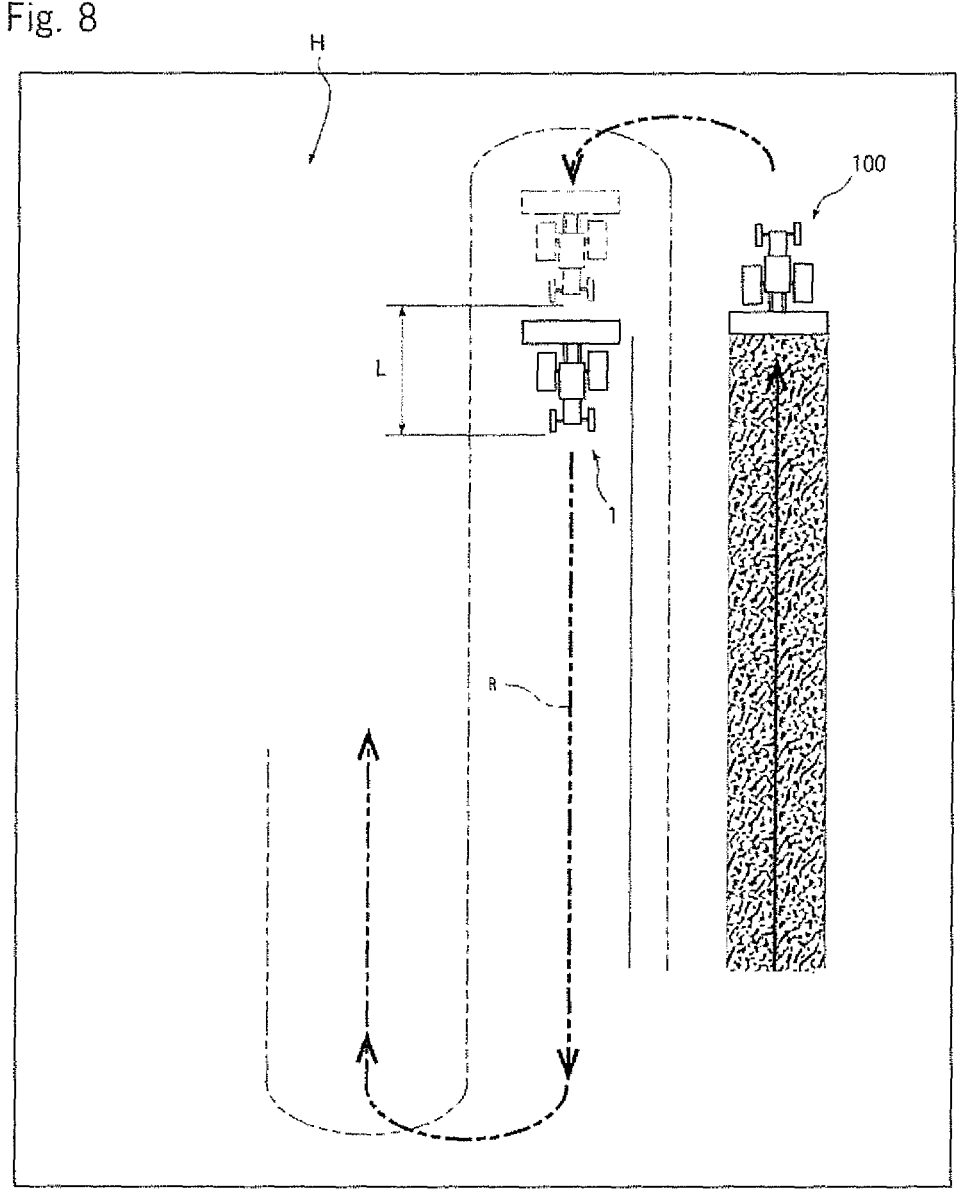
FIG. 8 is a drawing of a state of turning at the edge of the field.

In FIGS. 4 to 6, the embodiment in which the autonomously moving work vehicle 1 and the auxiliary moving work vehicle 100 travel in parallel (travel alongside in lateral direction) and perform the same work so as to treat twice as many widths at once is explained. However, as shown in FIGS. 7 and 8, in the case in which the autonomously moving work vehicle 1 and the auxiliary moving work vehicle 100 perform different work alongside in longitudinal direction, similarly to the above, the autonomously moving work vehicle 1 turns previously, travels for the set distance L and waits so as to wait finish of the butt turning of the auxiliary moving work vehicle 100 as shown in FIG. 8. In the case of performing the same work, the turning is performed while skipping one row.

As the above, in the control system of the parallel moving work vehicles, the autonomously moving work vehicle 1 having the position calculation means calculating the position of the vehicle body using the satellite positioning system, the steering actuator 40 operating the steering device, the engine controller 60 which is the engine rotation control means, the speed change means 44, and the control device 30 controlling them travels autonomously along the set traveling route R stored in the control device 30, and the autonomously moving work vehicle 1 is enabled to be operated by the remote control device 112 mounted on the auxiliary moving work vehicle 100 working while traveling auxiliary with the autonomously moving work vehicle 1. The control device 30 of the autonomously moving work vehicle 1 can be communicated with the remote control device 112 provided in the auxiliary moving work vehicle 100. When turning on the butt and traveling for the set distance, the autonomously moving work vehicle 1 stops once, and when the resume signal of the turning finish confirmation switch 114 provided in the auxiliary moving work vehicle 100 is received via the remote control device 112, or when the detection value of the steering sensor 120 provided in the auxiliary moving work vehicle 100 is transmitted via the remote control device 112 to the control device 30 of the autonomously moving work vehicle 1 so that the finish of the butt turning of the auxiliary moving work vehicle 100 is recognized, the work is resumed. Accordingly, after the turning of the autonomously moving work vehicle 1, the work can be continued while maintaining the predetermined distance without being separated from the auxiliary moving work vehicle 100, whereby it is not necessary that an operator rides on the autonomously moving work vehicle I and operates the turning at every butt turning so as to improve work efficiency. Two tractors can be operated by one operator by only adding the autonomously moving work vehicle 1 and the remote control device 112 without changing substantially the tractor owned conventionally, whereby the work efficiency can be improved.

As the second embodiment, concerning whether the auxiliary moving work vehicle 100 finishes the turning or not, the detection value of the azimuth sensor 132 provided in the auxiliary moving work vehicle 100 is inputted via the remote control device 112 to the control device 30 of the autonomously moving work vehicle 1, and the control device 30 judges whether the auxiliary moving work vehicle 100 turns at the butt or not. Namely, the traveling direction of the auxiliary moving work vehicle 100 is detected by the azimuth sensor 132 and when the auxiliary moving work vehicle 100 is judged to perform U-turn at the edge of the field so as to finish the butt turning by the azimuth, the work by the autonomously moving work vehicle 1 and the auxiliary moving work vehicle 100 is resumed. Accordingly, after the turning of the autonomously moving work vehicle 1, the work can be continued while maintaining the predetermined distance without being separated from the auxiliary moving work vehicle 100, whereby it is not necessary that an operator changes the autonomously moving work vehicle 1 and operates the turning at every butt turning so as to improve the work efficiency.

As the third embodiment, the camera 42 is attached to the autonomously moving work vehicle 1 so as to photo the auxiliary moving work vehicle 100 traveling auxiliary behind aslant the autonomously moving work vehicle 1 and working. For example, the camera 42 is attached to a right rear side and a left rear side of a roof of the cabin 11 so as to photo the slanting back side. When the autonomously moving work vehicle 1 reaches the edge of the field and turns at the butt, the auxiliary moving work vehicle 100 is out of a photography range. It is made to be butt turning state. When the autonomously moving work vehicle 1 finishes the butt turning, travels for the predetermined distance and stops, an image photographed by the camera 42 is processed and whether the auxiliary moving work vehicle 100 exists at a predetermined position in a predetermined range of the image or not is judged. Namely, when the auxiliary moving work vehicle 100 exists in the predetermined range of the image, the butt turning is judged to be finished and the work can be resumed. Accordingly, after the turning of the autonomously moving work vehicle 1, the work can be continued while maintaining the predetermined distance without being separated from the auxiliary moving work vehicle 100, whereby it is not necessary that an operator changes the autonomously moving work vehicle 1 and operates the turning at every butt turning so as to improve the work efficiency.

As the fourth embodiment, the control device 30 of the autonomously moving work vehicle 1 can be communicated with the remote control device 112 provided in the auxiliary moving work vehicle 100. When turning on the butt and traveling for the set distance, the autonomously moving work vehicle 1 stops once. The detection value of the work machine vertical movement detection means (the angle sensor 121) provided in the auxiliary moving work vehicle 100 is transmitted via the remote control device 112 to the control device 30 of the autonomously moving work vehicle 1. The work machine is lifted before the turning of the auxiliary moving work vehicle, and the finish of the butt turning is recognized when the butt turning is finished and the work machine is lowered. Accordingly, after the turning of the autonomously moving work vehicle 1, the work can be continued while maintaining the predetermined distance without being separated from the auxiliary moving work vehicle 100, whereby it is not necessary that an operator changes the autonomously moving work vehicle 1 and operates the turning at every butt turning so as to improve the work efficiency. By using the lifting switch provided in a handle stem or the angle sensor 121 of the lifting arm used at the time of performing work machine plowing depth control, the work machine vertical movement detection means can be realized by adding software without increasing number of parts.

In the sixth embodiment, the control device 30 of the autonomously moving work vehicle 1 can be communicated with the remote control device 112 provided in the auxiliary moving work vehicle 100. When turning on the butt and traveling for the set distance, the autonomously moving work vehicle 1 stops once. The detection value of the traveling speed detection means provided in the auxiliary moving work vehicle 100 is transmitted via the remote control device 112 to the control device 30 of the autonomously moving work vehicle 1. When the state in which the auxiliary moving work vehicle 100 is reduced its speed and stopped is recognized as the finish of the butt turning, the work is resumed. Accordingly, after the turning of the autonomously moving work vehicle 1, the work can be continued while maintaining the predetermined distance without being separated from the auxiliary moving work vehicle 100, whereby it is not necessary that an operator changes the autonomously moving work vehicle 1 and operates the turning at every butt turning so as to improve the work efficiency. By using the vehicle speed sensor 27 used for traveling control, the traveling speed detection means can be realized by adding software without increasing number of parts. Though details are omitted, in the fifth, seventh or eighth embodiment, it may alternatively be controlled that when the butt turning of the auxiliary moving work vehicle 100 is detected and recognized as the finish of the butt turning, the work is resumed.

[Second Embodiment]

In the first embodiment, when the autonomously moving work vehicle 1 turns at the butt, the traveling speed thereof is reduced and the following auxiliary moving work vehicle 100 enters the butt while maintaining the work speed, whereby when a distance between the autonomously moving work vehicle 1 and the auxiliary moving work vehicle 100 is short, the auxiliary moving work vehicle 100 entering the butt may interfere the work machine at a rear end of the autonomously moving work vehicle 1 starting the turning. Accordingly, it may alternatively be controlled that when the precedence work vehicle starts the butt turning, the following vehicle stops the traveling and waits, and after the precedence work vehicle finishes the butt turning, when the following work vehicle travels and turns, the precedence work vehicle stops and waits.

Figure 9:
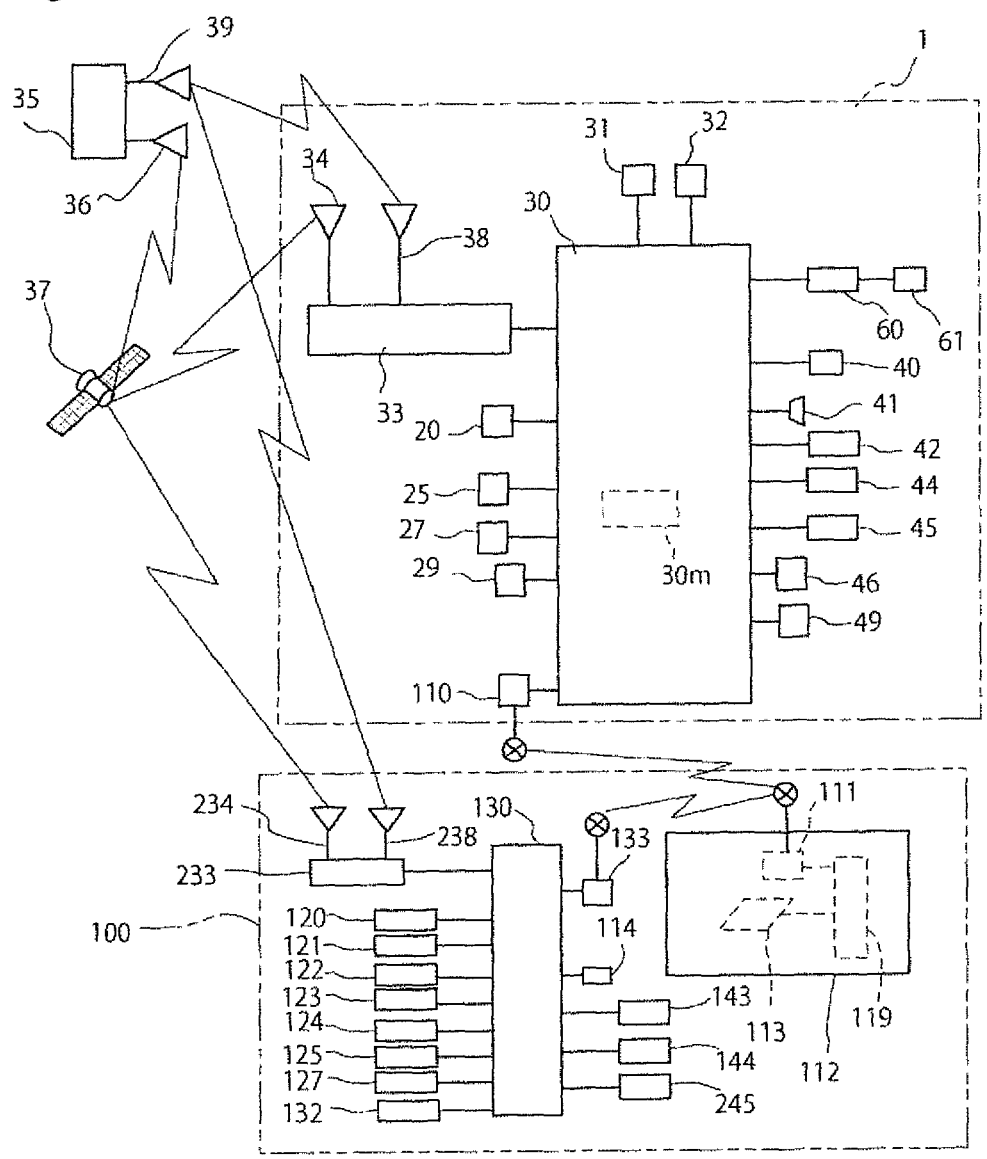
FIG. 9 is a control block diagram of another embodiment.
Figure 10:
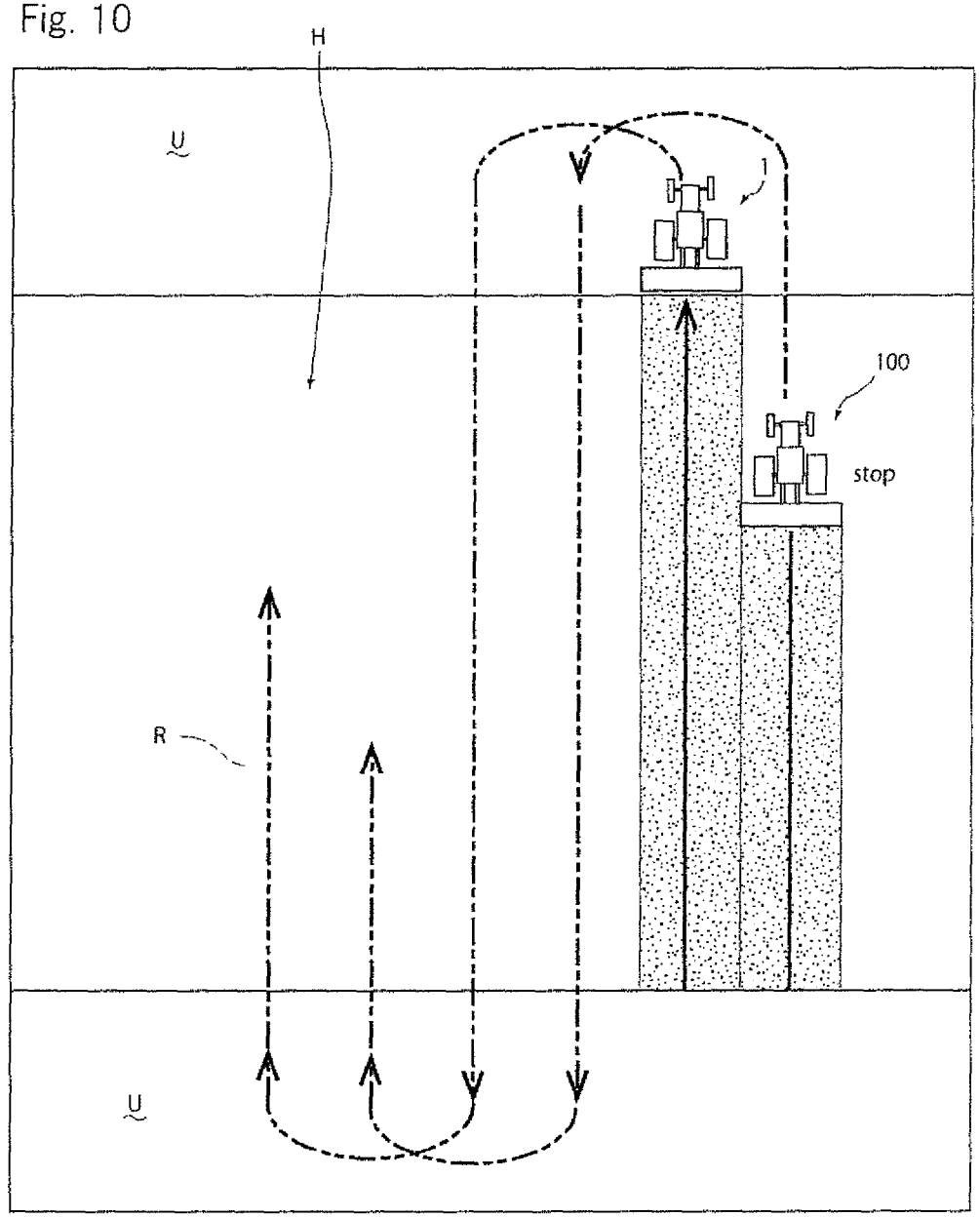
FIG. 10 is a drawing of a state of starting of turning at the butt of the precedence work vehicle.

Explaining concretely, as shown in FIG. 9, the control device 130 of the auxiliary moving work vehicle 100 is connected to a traveling stop means 143, a speed change means 144, a lifting actuator 125, a PTO switching means 245, and a mobile communication device 233 of the GPS for using the satellite positioning system, and the mobile communication device 233 is connected to a mobile GPS antenna 234 and a data reception antenna 238. The control device 130 can be communicated interactively with the remote control device 112 and the control device 30 via the communication devices 133, 110 and 111. As shown in FIG. 10, in the storage device 30m of the control device 30, the butt turning area U is set at the side of the edge of the field in the set traveling route R. When the autonomously moving work vehicle I is unmanned, the auxiliary moving work vehicle 100 may be either unmanned or maimed, and when the autonomously moving work vehicle 1 is manned, the auxiliary moving work vehicle 100 is unmanned, whereby the two vehicles can be supervised and operated by one operator. In the second embodiment, the precedence work vehicle is the unmanned autonomously moving work vehicle 1, and the following work vehicle is the manned auxiliary moving work vehicle 100.

In this configuration, in the control of the butt turning, as shown in FIG. 10, when the autonomously moving work vehicle 1 which is the precedence work vehicle enters the butt turning area U, a turning area entering signal is transmitted via the communication devices 110 and 133 to the control device 130 of the auxiliary moving work vehicle 100 which is the following work vehicle. The entering and leaving of the butt turning area U can be recognized easily by measuring a position of the vehicle by using the satellite positioning system.

When turning area entering signal is received, the control device 130 of the auxiliary moving work vehicle 100 operates the traveling stop means 143 so as to stop the traveling and the work (the work machine is not lifted).

When the autonomously moving work vehicle I enters the butt turning area U, the control device 30 operates the PTO switching means 45 so as to stop the work, lifts the rotary tilling device 24, and operates the speed change means 44 so as to turn at the butt while reducing the speed and traveling (at the butt turning speed).

Figure 11:
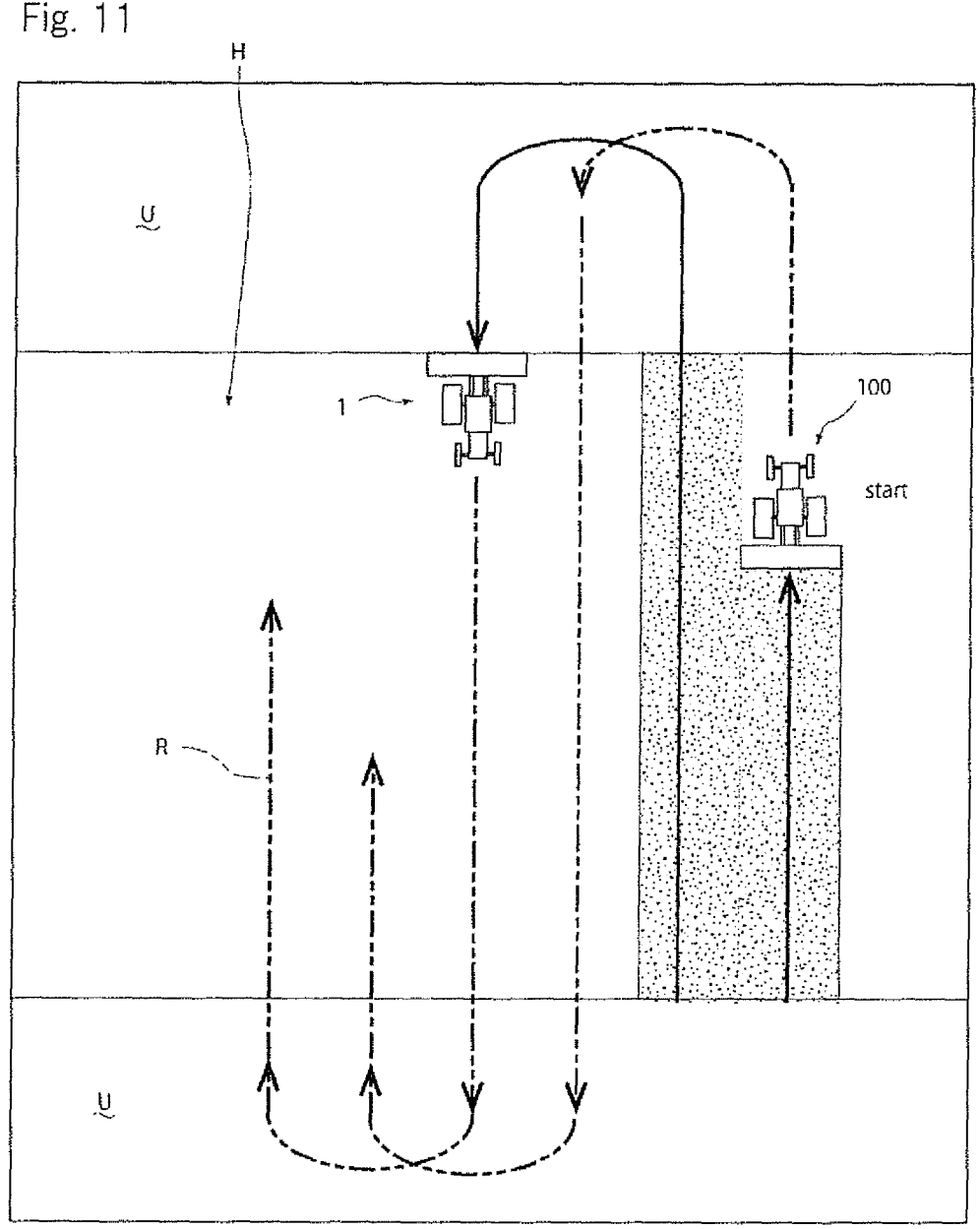
FIG. 11 is a drawing of a state of finishing of turning at the butt of the precedence work vehicle.

As shown in FIG. 11, when the autonomously moving work vehicle 1 finishes the butt turning (leaves the butt turning area U), the control device 30 operates the PTO switching means 45 so as to drive the work machine, operates the lifting actuator 25 so as to lowers the rotary tilling device 24, and operates the speed change means 44 so as to return to the work traveling speed and travel. Simultaneously, a butt turning finish signal is transmitted to the control device 130 of the auxiliary moving work vehicle 100, and the control device 130 operates the PTO switching means 245 so as to start the work and simultaneously operates the speed change means 144 so as to start the traveling.

Figure 12:
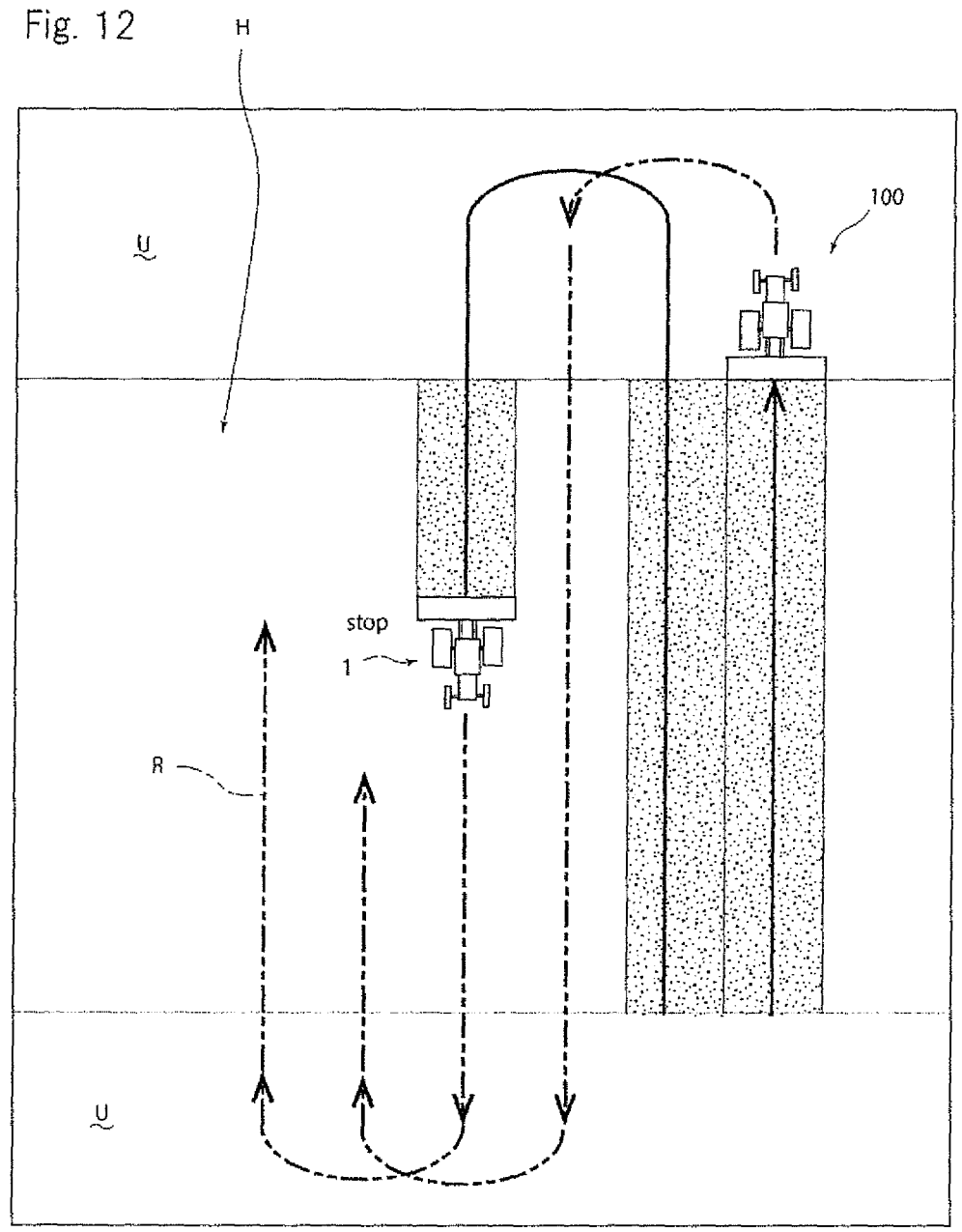
FIG. 12 is a drawing of a state of starting of turning at the butt of the following work vehicle.

As shown in FIG. 12, when the auxiliary moving work vehicle 100 enters the butt turning area U, a butt turning start signal is transmitted to the control device 30 of the autonomously moving work vehicle 1 and the traveling and the work of the autonomously moving work vehicle 1 are stopped similarly to the above, and simultaneously the control device 130 operates the PTO switching means 245 so as to stop the work of the auxiliary moving work vehicle 100, operates the lifting actuator 125 so as to lift the rotary tilling device 24, and operates the speed change means 144 so as to turn at the butt while reducing the speed and traveling.

Figure 13:
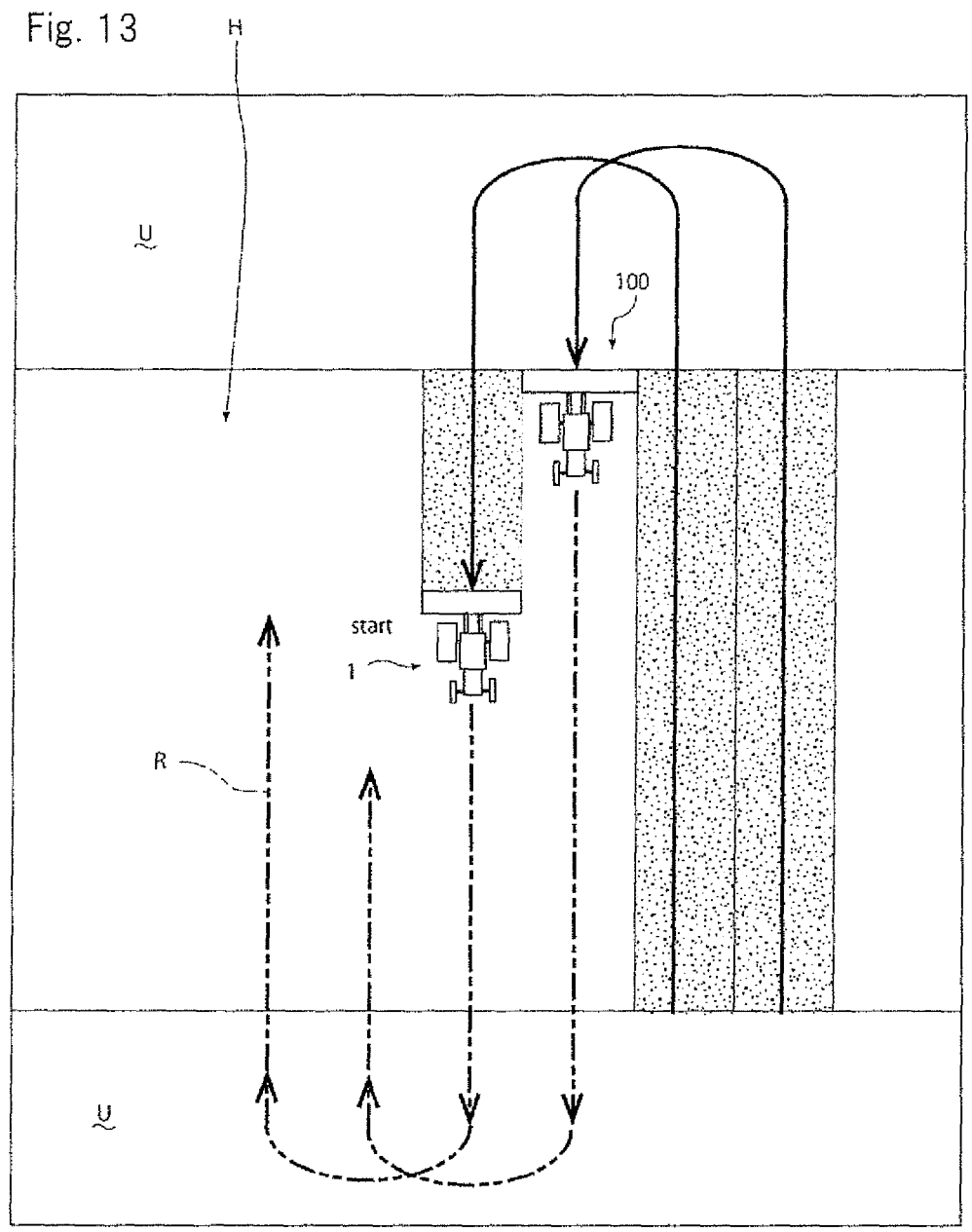
FIG. 13 is a drawing of a state of finishing of turning at the butt of the following work vehicle.

When the auxiliary moving work vehicle 100 finishes the butt turning, as shown in FIG. 13, the auxiliary moving work vehicle 100 returns to the work traveling speed and travels and resumes the work, and transmits a butt turning finish signal is transmitted to the control device 30 of the autonomously moving work vehicle 1. The control device 30 of the autonomously moving work vehicle 1 receiving the signal resumes the traveling and the work. Accordingly, the work is performed to the next edge of the field, and the turning control is performed similarly to the above (the case in which the butt turning is judged by satellite positioning information and map information is referred to as a ninth embodiment).

Instead of the satellite positioning information and the map information, the butt turning may alternatively be judged by the detection means of either one of the first to eighth embodiments.

Namely, in the first embodiment, the start of the butt turning is detected by the steering sensors 20 and 120 as a butt turning start detection means and a butt turning finish detection means and inputted to the control devices 30 and 130, and the start and stop of the butt turning of the autonomously moving work vehicle 1 and the auxiliary moving work vehicle 100 are judged by detection values of the steering sensors 20 and 120. For example, concerning the start of the butt turning of the auxiliary moving work vehicle 100, when the steering wheel is rotated from a straight traveling position for not less than a set angle, the butt turning is judged to be started, and after the rotation for not less than the set angle, when the steering wheel is returned to the straight traveling position and straight traveling state is maintained for not less than predetermined time, the butt turning is judged to be finished. The start and the stop of the butt turning of the autonomously moving work vehicle 1 are judged similarly. The start and the stop of the butt turning of the autonomously moving work vehicle 1 and the auxiliary moving work vehicle 100 may be judged by the control device 30, the control device 130 or the control device 119.

In the second embodiment, the start and the stop of the butt turning is judged by the detection values of the azimuth sensors 32 and 132 as the butt turning start detection means and the butt turning finish detection means. When the autonomously moving work vehicle 1 or the auxiliary moving work vehicle 100 turns and the traveling direction is changed, the azimuth of the traveling direction is detected by the azimuth sensors 32 and 132 and inputted to the control devices 30 and 130. For example, when the direction of the vehicle body is changed for not less than a set angle, the azimuth sensor 132 of the auxiliary moving work vehicle 100 judges as the start of the butt turning, and when the traveling direction is changed reversely (for about 180°) from a direction of the start of the butt turning, the azimuth sensor 132 judges as the finish of the butt turning. The start and the stop of the butt turning of the autonomously moving work vehicle 1 are judged similarly.

In the third embodiment, the start and the stop of the butt turning is judged by an image from the camera 42 as the butt turning start detection means and the butt turning finish detection means provided in the autonomously moving work vehicle 1. For example, the camera 42 is provided on the cabin 11 of the autonomously moving work vehicle 1 and photos the circumference, and when the autonomously moving work vehicle 1 starts the butt turning, the image of the auxiliary moving work vehicle 100 traveling behind aslant the autonomously moving work vehicle 1 is shifted gradually. When a shift amount is not less than a set value, the butt turning of the autonomously moving work vehicle 1 is judged to be started. When the autonomously moving work vehicle 1 finishes the butt turning, the auxiliary moving work vehicle 100 is reversed in the longitudinal direction. When the auxiliary moving work vehicle 100 starts the butt turning, a change amount of the shape is increased. When the auxiliary moving work vehicle 100 finishes the butt turning, the shape is similar to that before the start of the butt turning. However, the judgment of the start and the stop of the butt turning is judged by the image is not limited to the change of the shape of the auxiliary moving work vehicle 100 and may alternatively be performed change of shape of an image of a boundary of the field and a ridge. The camera may be mounted on the auxiliary moving work vehicle 100 so as to judge the start and the stop of the butt turning.

In the fourth embodiment, the start and the stop of the butt turning is judged by the angle sensor 121 detecting vertical movement of the work machine (the rotary tilling device 224). For example, when the detection value of the angle sensor 121 as the butt turning start detection means and the butt turning finish detection means of the auxiliary moving work vehicle 100 is not less than a set angle, it means that the work machine is lifted, and the butt turning is judged to be started. When the detection value of the angle sensor 121 is not more than the set angle, it means that the work machine is lowered, and the butt turning is judged to be finished. Instead of the detection value of the angle sensor 121, the start and the stop of the butt turning may alternatively be judged by operation of a lifting switch or a lowering switch.

In the fifth embodiment, it may be configured that on/off of the PTO of the work machine is detected and the start and the stop of the butt turning is judged by a signal of the on/off. For example, when the turning off of the PTO on/off detection means 124 as the butt turning start detection means and the butt turning finish detection means of the auxiliary moving work vehicle 100 is detected, the butt turning is judged to be started, and when the turning on of the PTO on/off detection means 124 is detected, the butt turning is judged to be finished.

In the sixth embodiment, the start and the stop of the butt turning may be judged by variation of the traveling speed. For example, when the auxiliary moving work vehicle 100 approaches the edge of the field, the traveling speed is detected by the vehicle speed sensor 127 as the butt turning start detection means and the butt turning finish detection means, and the speed is not more than a set speed (butt turning speed), the butt turning is judged to be started, and when the auxiliary moving work vehicle 100 lifts the work machine, turns at low speed, lowers the work machine and accelerate to the work speed and the traveling speed is not less than the set speed (work speed), the butt turning is judged to be finished.

In the seventh embodiment, the start and the stop of the butt turning may be judged by the speed change position. For example, when the speed change position of the auxiliary moving work vehicle 100 is detected by the speed change position detection means 122 as the butt turning start detection means and the butt turning finish detection means, and the speed change position is a position reduced from a work speed change position, the butt turning is judged to be started, and when the work speed change position (acceleration) is detected, the butt turning is judged to be finished.

In the eighth embodiment, the start and the stop of the butt turning may be judged by the engine rotation speed. For example, when the detection value of the engine rotation speed detection means 123 as the butt turning start detection means and the butt turning finish detection means of the auxiliary moving work vehicle 100 is reduced from a work rotation speed for not more than a set rotation speed, the butt turning is judged to be started, and when the rotation speed is increased to the work rotation speed, the butt turning is judged to be finished.

The start and the stop of the butt turning of the autonomously moving work vehicle 1 are judged similarly to the start and the stop of the butt turning of the auxiliary moving work vehicle 100.

As the above, in the work system, the autonomously moving work vehicle 1 which is the manned or unmanned precedence work vehicle and the auxiliary moving work vehicle 100 which is the manned or unmanned following work vehicle travel in parallel reciprocally on the traveling route R set in the field and work. The autonomously moving work vehicle 1 and the auxiliary moving work vehicle 100 have respectively the control devices 30 and 130, the communication devices 110 and 133, the butt turning start detection means, the butt turning finish detection means, and the remote control device 112 which can be communicated with the control devices 30 and 130. Until the autonomously moving work vehicle 1 leaves the butt turning area U, the traveling and the work of the auxiliary moving work vehicle 100 is limited. Namely, when the control device 30 of the autonomously moving work vehicle 1 detects the start of the butt turning, the turning start signal is transmitted to the auxiliary moving work vehicle 100, and the control device 130 of the auxiliary moving work vehicle 100 stops the traveling and the work. Accordingly, when the autonomously moving work vehicle 1 reduces its speed and turns at the butt, there is no possibility that the following auxiliary moving work vehicle 100 catches up and contacts the work machine and the like of the autonomously moving work vehicle 1.

When the control device 30 of the precedence autonomously moving work vehicle 1 detects the finish of the butt turning, the control device 130 of the following auxiliary moving work vehicle 100 resumes the traveling and the work. Accordingly, when the autonomously moving work vehicle 1 is turning, the auxiliary moving work vehicle 100 does not enter the butt turning area U.

When the control device 130 of the following auxiliary moving work vehicle 100 detects the start of the butt turning, the control device 30 of the precedence autonomously moving work vehicle 1 stops the traveling and the work. Accordingly, the autonomously moving work vehicle 1 does not leave distantly while the auxiliary moving work vehicle 100 reduces its speed and turns.

When the control device 130 of the following auxiliary moving work vehicle 100 detects the finish of the butt turning, the control device 30 of the precedence autonomously moving work vehicle 1 resumes the traveling and the work. Accordingly, the parallel traveling work can be performed while maintaining fixed distance and the manned vehicle can supervise the unmanned vehicle.

[Third Embodiment]

In the second embodiment, the precedence work vehicle stops the work while traveling at the time of entering the butt turning area U, and starts the work while traveling at the time of leaving the butt turning area U. Similarly to the precedence work vehicle, the following work vehicle stops the work while traveling at the time of entering the butt turning area U, and starts the work while traveling at the time of leaving the butt turning area U. In this work mode, work such as rough cultivation and tilling before transplantation is almost satisfactory. However, in seeding work and planting work, seeds and seedlings are not put into the ground and do not grow up in a work start part and a finish part. In fertilization work, manure is sprinkled in the work start part and the finish part.

Then, in a third embodiment, the butt turning start detection means and the butt turning finish detection means are provided in each of the autonomously moving work vehicle 1 which is the precedence work vehicle and the auxiliary moving work vehicle 100 which is the following work vehicle. When the autonomously moving work vehicle I and the auxiliary moving work vehicle 100 enter the butt turning area U, the traveling is stopped once and simultaneously the work is stopped, the work machine is lifted and the butt turning is performed. When the vehicles leave the butt turning area U, the traveling is stopped once, and the work machine is lowered and the traveling and the work are resumed simultaneously.

Concretely, when the autonomously moving work vehicle 1 enters the butt turning area U (FIG. 10), the autonomously moving work vehicle 1 and the auxiliary moving work vehicle 100 stop the traveling and the work, and the autonomously moving work vehicle 1 operates the lifting actuator 25 so as to lift the work machine and starts the traveling at the butt turning speed. When the butt turning of the autonomously moving work vehicle 1 is finished (FIG. 11), the auxiliary moving work vehicle 100 resumes the traveling and the work, and the autonomously moving work vehicle 1 stops the traveling, lowers the work machine, and confirms the lowering and then resumes the traveling and the work simultaneously. The lowering of the work machine can be confirmed by a detection value of the angle sensor 21 provided in the work machine attachment device 23.

When the auxiliary moving work vehicle 100 enters the butt turning area U (FIG. 12), the autonomously moving work vehicle 1 stops the traveling and the work, and the auxiliary moving work vehicle 100 stops the traveling and the work, lifts the work machine and starts the butt turning. When the auxiliary moving work vehicle 100 finishes the butt turning (FIG. 13), the autonomously moving work vehicle 1 starts the traveling and the work, and the auxiliary moving work vehicle 100 stops the traveling, lowers the work machine, and confirms the lowering and then starts the traveling and the work. The other processes are controlled similarly to the second embodiment. Accordingly, at the time of starting the work after the butt turning, the work machine is lowered to the ground surface and the work can be performed certainly.

[Fourth Embodiment]

When the precedence work vehicle is unmanned and the following work vehicle is manned, the following work vehicle can perform the work while confirming traveling state and work state of the precedence work vehicle. However, in FIG. 11, when the precedence work vehicle finishes the butt turning and subsequently the following work vehicle starts the traveling, the following work vehicle passes by the precedence work vehicle at the middle, and it is necessary to change the direction rearward for confirming the precedence work vehicle, whereby the confirmation is difficult.

Figure 14:
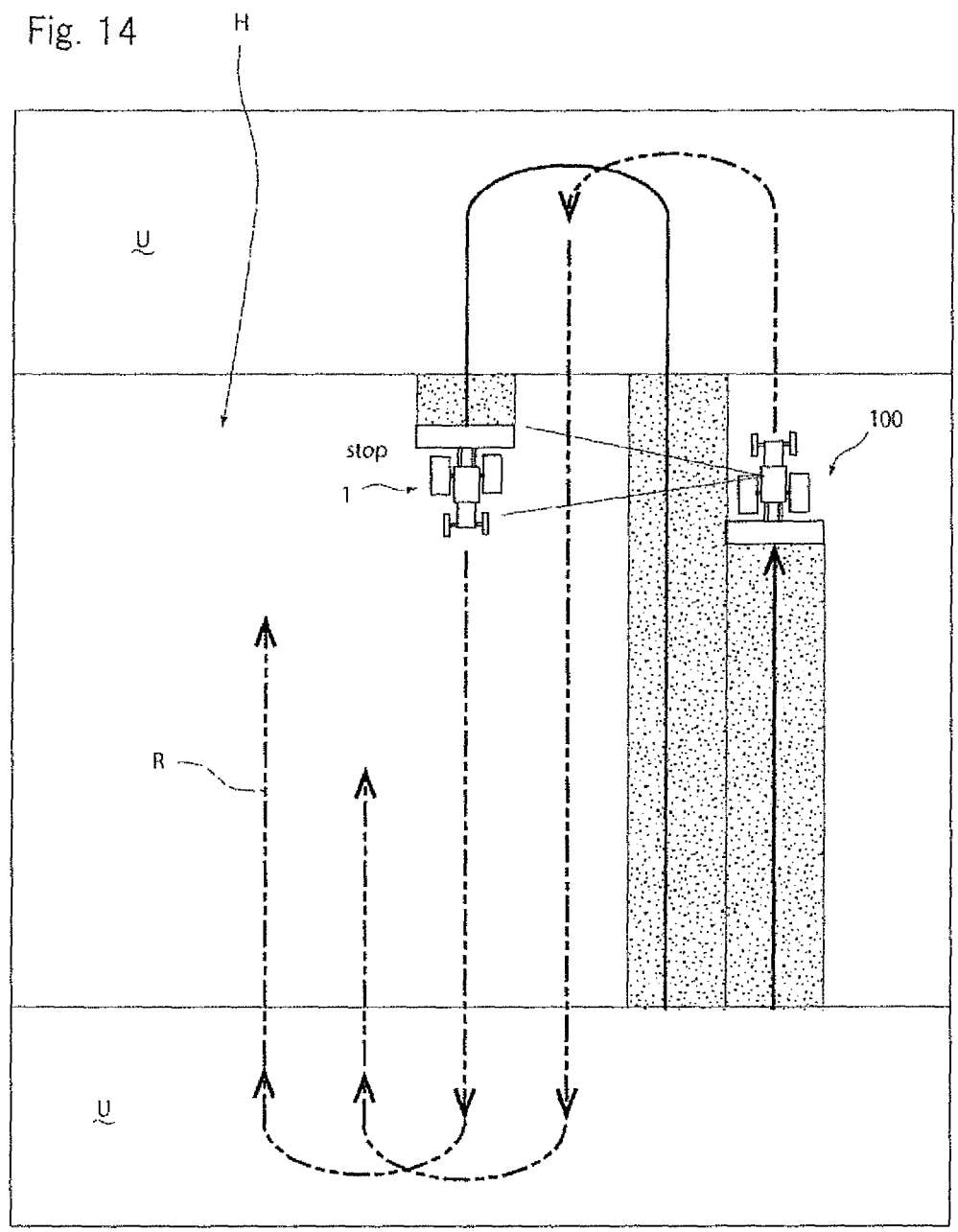
FIG. 14 is a drawing of a state in which the autonomous moving work vehicle and an auxiliary moving work vehicle pass each other.

Then, in a fourth embodiment, from the state in which the autonomously moving work vehicle 1 starts the butt turning and the auxiliary moving work vehicle 100 stops the traveling and the work, the autonomously moving work vehicle 1 finishes the butt turning and the auxiliary moving work vehicle 100 starts the traveling (FIG. 11). As shown in FIG. 14, when the autonomously moving work vehicle 1 passes by the butt turning and the auxiliary moving work vehicle 100 and the autonomously moving work vehicle 1 comes out from a field of view of an operator, the control device 30 of the autonomously moving work vehicle 1 which is the precedence work vehicle is communicated with the remote control device 112 provided in the auxiliary moving work vehicle 100 which is the following work vehicle, and the positions of the autonomously moving work vehicle 1 and the auxiliary moving work vehicle 100 are positioned and calculated by using the satellite positioning system, and when reaching a position of passing by the auxiliary moving work vehicle 100, the autonomously moving work vehicle 1 stops the traveling and the work at once. At the passing-by position, the autonomously moving work vehicle 1 and the auxiliary moving work vehicle 100 exist alongside oppositely in lateral direction.

Figure 15:
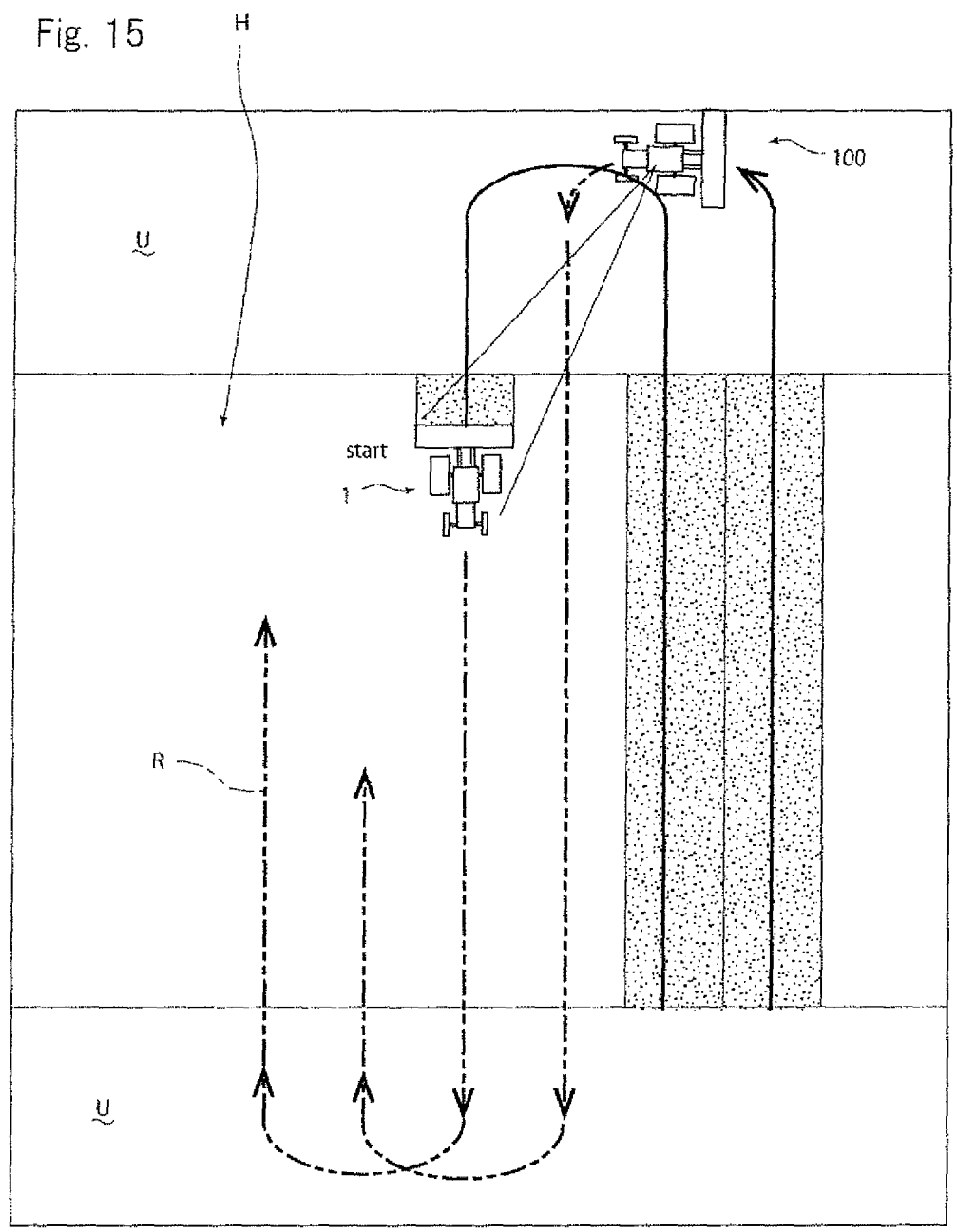
FIG. 15 is a drawing of a state in which the autonomous moving work vehicle is within a visual field of the auxiliary moving work vehicle.

As shown in FIG. 15, when the auxiliary moving work vehicle 100 is in the middle of the butt turning and the autonomously moving work vehicle 1 enters the field of view, namely, when the auxiliary moving work vehicle 100 is sideways to the work traveling direction (the auxiliary moving work vehicle 100 is substantially perpendicularly to the traveling direction of the autonomously moving work vehicle 1 in the butt turning area U), the autonomously moving work vehicle I resumes the traveling and the work. Subsequent control is similar to the above. Accordingly, when the autonomously moving work vehicle 1 comes out from the field of view of the operator, the autonomously moving work vehicle 1 is stopped, and when the autonomously moving work vehicle 1 enters the field of view, the traveling and the work are resumed. Accordingly, the work can be performed safely.

The passing-by of the autonomously moving work vehicle 1 and the auxiliary moving work vehicle 100 can be detected by photographing the side by the camera of the third embodiment, detecting the positions of the autonomously moving work vehicle 1 and the auxiliary moving work vehicle 100 by positioning them by the satellite positioning of the ninth embodiment, or by detecting the passing-by position of the autonomously moving work vehicle 1 by positioning the remote control device 112. The position of the entry of the autonomously moving work vehicle 1 to the field of view at the time at which the auxiliary moving work vehicle 100 travels in the butt can be detected by using the steering sensor 120 of the first embodiment, the azimuth sensor 132 of the second embodiment, the camera of the third embodiment, or the satellite positioning of the ninth embodiment.

INDUSTRIAL APPLICABILITY

The present invention can be used for a control device of a construction machine, an agricultural vehicle or the like that two work vehicles travel in parallel and work in a predetermined work area such as the field.

DESCRIPTION OF NOTATIONS 1 autonomous moving work vehicle
30 control device
40 steering actuator
42 camera
44 speed change means
60 engine controller
100 auxiliary moving work vehicle
112 remote control device
114 turning finish confirmation switch
120 steering sensor
132 azimuth sensor Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A control device of a work vehicle of a work system in which a manned or unmanned precedence work vehicle and a manned or unmanned following work vehicle travel in parallel reciprocally on a traveling route set in a field and work, wherein:
    each of the precedence work vehicle and the following work vehicle has the control device, a communication device which can be communicated with the other vehicle, a butt turning start detector, and a butt turning finish detector;
    when the control device of the precedence work vehicle detects a start of butt turning of the precedence work vehicle, a butt turning start signal is transmitted to the following work vehicle, and the control device of the following work vehicle stops traveling and work;
    when the control device of the precedence work vehicle detects finish of the butt turning of the precedence work vehicle, the control device of the following work vehicle resumes the traveling and the work; and
    wherein, butt turning detector or the butt turning start detector and the butt turning finish detector is a camera mounted on the precedence work vehicle, the camera photographs the following work vehicle, and the control device processes an image of the camera and judges as start of the butt turning when the image of the following work vehicle is changed for not less than a set amount and judges as finish of the butt turning when the image of the following work vehicle is similar to the image before the turning.

2. A control device of a work vehicle of a work system in which a manned or unmanned precedence work vehicle and a manned or unmanned following work vehicle travel in parallel reciprocally on a traveling route set in a field and work, wherein:
    each of the precedence work vehicle and the following work vehicle has the control device, a communication device which can be communicated with the other vehicle, a butt turning start detector, and a butt turning finish detector; and
    when the control device of the precedence work vehicle detects a start of butt turning of the precedence work vehicle, a butt turning start signal is transmitted to the following work vehicle, and the control device of the following work vehicle stops traveling and work;
    wherein:
    when the control device of the following work vehicle detects the start of the butt turning of the following work vehicle, the control device of the precedence work vehicle stops the traveling and the work.

3. The control device of the work vehicle according to claim 2, wherein:
    a butt turning detector or the butt turning start detector and the butt turning finish detector is a camera mounted on the precedence work vehicle, the camera photographs the following work vehicle, and the control device processes an image of the camera and judges as start of the butt turning when the image of the following work vehicle is changed for not less than a set amount and judges as finish of the butt turning when the image of the following work vehicle is similar to the image before the turning.

4. A control device of a work vehicle of a work system in which a manned or unmanned precedence work vehicle and a manned or unmanned following work vehicle travel in parallel reciprocally on a traveling route set in a field and work, wherein:
    each of the precedence work vehicle and the following work vehicle has the control device, a communication device which can be communicated with the other vehicle, a butt turning start detector and a butt turning finish detector; and
    when the control device of the precedence work vehicle detects a start of butt turning of the precedence work vehicle, a butt turning start signal is transmitted to the following work vehicle, and the control device of the following work vehicle stops traveling and work;
    wherein:
    when the control device of the following work vehicle detects the finish of the butt turning of the following work vehicle, the control device of the precedence work vehicle resumes the traveling and the work.

5. The control device of the work vehicle according to claim 4, wherein:
    a butt turning detector or the butt turning start detector and the butt turning finish detector is a camera mounted on the precedence work vehicle, the camera photographs the following work vehicle, and the control device processes an image of the camera and judges as start of the butt turning when the image of the following work vehicle is changed for not less than a set amount and judges as finish of the butt turning when the image of the following work vehicle is similar to the image before the turning.

6. A control device of a work vehicle of a work system in which a manned or unmanned precedence work vehicle and a manned or unmanned following work vehicle travel in parallel reciprocally on a traveling route set in a field and work, wherein:
    each of the precedence work vehicle and the following work vehicle has the control device, a communication device which can be communicated with the other vehicle, a butt turning start detector and a butt turning finish detector; and
    when the control device of the precedence work vehicle detects a start of butt turning of the precedence work vehicle, a butt turning start signal is transmitted to the following work vehicle, and the control device of the following work vehicle stops traveling and work;

wherein:

a butt turning detector or the butt turning start detector and the butt turning finish detector is a camera mounted on the precedence work vehicle, the camera photographs the following work vehicle, and the control device processes an image of the camera and judges as start of the butt turning when the image of the following work vehicle is changed for not less than a set amount and judges as finish of the butt turning when the image of the following work vehicle is similar to the image before the turning.

7. The control device of the work vehicle according to claim 6, wherein:

a first satellite positioning system is mounted on the precedence work vehicle;

a second satellite positioning system with lower accuracy than the first satellite positioning system is mounted on a remote control device carried into the following work vehicle;

actual positions of the precedence work vehicle and the following work vehicle are positioned by the first satellite positioning system and the second satellite positioning system; and the positions of the precedence work vehicle and the following work vehicle are displayed by a display.

8. A control device of a work vehicle of a control system of parallel moving work vehicles in which an autonomously moving work vehicle having a position calculation means calculating a position of a vehicle body using a satellite positioning system, a steering actuator operating a steering device, a drive source controller, a speed change means, and the control device controlling the autonomous travels along a set traveling route stored in the control device, and the autonomously moving work vehicle can be operated by a remote control device mounted on a following moving work vehicle working while traveling following with the autonomously moving work vehicle, wherein:

the control device of the autonomously moving work vehicle can be communicated with the remote control device provided in the following moving work vehicle;

the autonomously moving work vehicle is stopped once when traveling for a set distance after butt turning and resumes work when finish of butt turning of the following moving work vehicle is detected by a butt turning detector provided in the following moving work vehicle, a signal thereof is transmitted via the remote control device to the control device of the autonomously moving work vehicle so as to resume work; and wherein the butt turning detector or a butt turning start detector and a butt turning finish detector is a camera mounted on the autonomously moving work vehicle, the camera photographs the following moving work vehicle, and the control device processes an image of the camera and judges as start of the butt turning when the image of the following moving work vehicle is changed for not less than a set amount and judges as the finish of the butt turning when the image of the following moving work vehicle is similar to the image before the turning.

9. The control device of the work vehicle according to claim 8, wherein:

a first satellite positioning system is mounted on the autonomously moving work vehicle;

a second satellite positioning system with lower accuracy than the first satellite positioning system is mounted on the remote control device carried into the following work vehicle;

actual positions of the autonomously moving work vehicle and the following moving work vehicle are positioned by the first satellite positioning system and the second satellite positioning system; and the positions of the autonomously moving work vehicle and the following moving work vehicle are displayed by a display.

10. A control device of a work vehicle of a control system of parallel moving work vehicles in which a precedence work vehicle having a position calculation means calculating a position of a vehicle body using a satellite positioning system, a steering actuator operating a steering device, a drive source controller, a speed change means, and the control device controlling the autonomous travels along a set traveling route stored in the control device, and a following work vehicle having a second position calculation means calculating a position of a vehicle body using the satellite positioning system works while traveling following with the precedence work vehicle, wherein:

the control device of the precedence work vehicle can be communicated with a remote control device provided in the following work vehicle;

the precedence work vehicle turns at a butt and travels while working, and stops the traveling and the work once when reaching a passing-by position with the following work vehicle; and wherein the control device of the precedence work vehicle resumes the traveling and the work when the following work vehicle is in a direction perpendicular to a traveling direction of the precedence work vehicle at the butt turning.

11. The control device of the work vehicle according to claim 10, wherein:

a first satellite positioning system is mounted on the precedence work vehicle;

a second satellite positioning system with lower accuracy than the first satellite positioning system is mounted on the remote control device carried into the following work vehicle;

actual positions of the precedence work vehicle and the following work vehicle are positioned by the first satellite positioning system and the second satellite positioning system; and the positions of the precedence work vehicle and the following work vehicle are displayed by a display.

* * * * *